United States Patent
Ha et al.

(10) Patent No.: US 9,083,959 B2
(45) Date of Patent: Jul. 14, 2015

(54) REAL-TIME AUTOMATIC CONVERSION OF 2-DIMENSIONAL IMAGES OR VIDEO TO 3-DIMENSIONAL STEREO IMAGES OR VIDEO

(71) Applicant: Intel Corporation, Santa Clara, CA (US)

(72) Inventors: Hyeong-Seok V. Ha, Los Gatos, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 13/977,380

(22) PCT Filed: Feb. 20, 2013

(86) PCT No.: PCT/US2013/026801
§ 371 (c)(1),
(2) Date: Jun. 28, 2013

(87) PCT Pub. No.: WO2014/130019
PCT Pub. Date: Aug. 28, 2014

(65) Prior Publication Data
US 2014/0232820 A1    Aug. 21, 2014

(51) Int. Cl.
*H04N 13/00*    (2006.01)
*H04N 13/02*    (2006.01)

(52) U.S. Cl.
CPC ......... *H04N 13/0271* (2013.01); *H04N 13/026* (2013.01)

(58) Field of Classification Search
CPC .................................................... H04N 13/026
See application file for complete search history.

(56) References Cited

U.S. PATENT DOCUMENTS

| | | | | |
|---|---|---|---|---|
| 6,055,340 A | * | 4/2000 | Nagao | 382/261 |
| 6,628,842 B1 | * | 9/2003 | Nagao | 382/266 |
| 7,098,958 B2 | * | 8/2006 | Wredenhagen et al. | 348/452 |
| 7,532,762 B2 | * | 5/2009 | Sekiguchi et al. | 382/233 |
| 7,545,442 B2 | | 6/2009 | Huang et al. | |
| 8,180,145 B2 | | 5/2012 | Wu et al. | |
| 8,249,346 B2 | * | 8/2012 | Dammann | 382/173 |
| 8,330,801 B2 | * | 12/2012 | Wang et al. | 348/46 |
| 8,768,093 B2 | * | 7/2014 | Yoo et al. | 382/275 |
| 8,787,655 B2 | * | 7/2014 | Tatsumi | 382/154 |
| 8,861,836 B2 | * | 10/2014 | Wei et al. | 382/154 |
| 2003/0231321 A1 | * | 12/2003 | Aoyama | 358/1.2 |
| 2009/0073266 A1 | * | 3/2009 | Abdellaziz Trimeche et al. | 348/180 |

(Continued)

FOREIGN PATENT DOCUMENTS

| | | |
|---|---|---|
| TW | I253849 | 4/2006 |
| TW | I362628 | 4/2012 |

(Continued)

OTHER PUBLICATIONS

Graziosi et al. "Depth map Up-sampling Based on Edge Lyers". (Dec. 2012) Mitsubishi Research Lab.*

(Continued)

*Primary Examiner* — Sath V Perungavoor
*Assistant Examiner* — Matthew J Anderson
(74) *Attorney, Agent, or Firm* — Green, Howard & Mughal LLP

(57) ABSTRACT

Systems, apparatus and methods are described related to real-time automatic conversion of 2-dimensional images or video to 3-dimensional stereo images or video.

25 Claims, 10 Drawing Sheets

(56) References Cited

U.S. PATENT DOCUMENTS

| | | | |
|---|---|---|---|
| 2010/0073364 | A1 | 3/2010 | Jung |
| 2010/0321524 | A1* | 12/2010 | Lin et al. .................... 348/224.1 |
| 2012/0020556 | A1* | 1/2012 | Manabe ..................... 382/167 |
| 2012/0056984 | A1 | 3/2012 | Zhang et al. |
| 2012/0274626 | A1 | 11/2012 | Hsieh |
| 2012/0281906 | A1 | 11/2012 | Appia |
| 2012/0293615 | A1* | 11/2012 | Chen et al. ..................... 348/43 |
| 2012/0321213 | A1* | 12/2012 | Crucs ............................ 382/262 |
| 2013/0033578 | A1* | 2/2013 | Wajs .............................. 348/46 |
| 2014/0016880 | A1* | 1/2014 | Kerofsky et al. ............. 382/274 |
| 2014/0193094 | A1* | 7/2014 | Shin et al. ..................... 382/264 |

FOREIGN PATENT DOCUMENTS

| | | |
|---|---|---|
| TW | I366035 | 6/2012 |
| WO | 2011/014421 A2 | 2/2011 |

OTHER PUBLICATIONS

Nayar, Shree. "Shape from Focus" (Nov. 1989) Carnegie Mellon Univ. Thesis.*

International Search Report and Written Opinion Received for PCT Patent Application No. PCT/US2013/026801, mailed on Nov. 5, 2013, 10 Pages.

Caviedes, et al., "Real Time 2D to 3D Conversion: Technical and Visual Quality Requirements", 2011 IEEE International Conference on Consumer Electronics (ICCE), 2011, pp. 897-898.

Chan, et al., "Depth Estimation From a Single Image Using Defocus Cues", Proceedings of the 2011 International Conference on Machine Learning and Cybernetics, Guilin, Jul. 10-13, 2011, pp. 1732-1738.

Feng, et al., "Object-Based 2D-to-3D Video Conversion for Effective Stereoscopic Content Generation in 3D-TV Applications", IEEE Transactions on Broadcasting, vol. 57, No. 2, Jun. 2011, pp. 500-509.

Gaspar, et al., "Monocular Depth from Focus Estimation with Complementary Filters", 2011 IEEE International Conference on Robotics and Automation Shanghai International Conference Center May 9-13, 2011, Shanghai, China, pp. 4986-4991.

Han, et al., "Geometric and Texture Cue Based Depth-map Estimation for 2D to 3D Image Conversion", 2011 IEEE International Conference on Consumer Electronics (ICCE), 2011, pp. 651-652.

Minhas, et al., "An Efficient Algorithm for Focus Measure Computation in Constant Time", IEEE Transactions on Circuits and Systems for Video Technology, vol. 22, No. 1, Jan. 2012, pp. 152-156.

Tsai, et al., "A Real-Time 1080p 2D-to-3D Video Conversion System", 2011 IEEE International Conference on Consumer Electronics (ICCE), 2011, pp. 803-804.

Tsai, et al., "A Real-Time 1080p 2D-to-3D Video Conversion System", IEEE Transactions on Consumer Electronics, vol. 57, No. 2, May 2011, pp. 915-922.

Yu, et al., "Depth Generation Method for 2d to 3d Conversion", 3DTV Conference: The True Vision—Capture, Transmission and Display of 3D Video (3DTV-CON), 2011, 4 Pages.

Zhang, et al., "3D-TV Content Creation: Automatic 2D-to-3D Video Conversion", IEEE TRansactions on Broadcasting, vol. 57, No. 2, Jun. 2011, pp. 372-383.

Taiwan Office Action and IPO Search Report for Taiwan Patent Application No. 103102957, mailed Apr. 22, 2015.

* cited by examiner

REAL-TIME AUTOMATIC CONVERSION OF 2-DIMENSIONAL IMAGES OR VIDEO TO 3-DIMENSIONAL STEREO IMAGES OR VIDEO

BACKGROUND

In 3-dimensional (3D) imaging, a 2-dimensional (2D) images; or video frames may be convened to 3D stereo images or videos for presentation to a user. The 3D stereo images or video (typically, a left image or video and a right image or video) may be presented for a user who may experience a 3D effect from the images. With the recent development and commercialization of various 3D stereo displays on televisions, monitors, smart phones, and tablet devices, the demand for stereo 3D content is increasing. 2D to 3D conversion technology is highly sought after by contest producers and consumers alike to convert existing 2D images and videos to 3D for more vivid visualization and entertainment.

In general, there may be three main categories of 2D to 3D conversion technology; manual, semi-automatic, and automatic. A, manual process typically involves human operators and artists examining an image or each frame of a video sequence and assigning depth values for those images or frames. Such processes are expensive in terms of human labor cost and processing time. A semi-automatic technology typically utilises automated elements such as computer software, or hardware devices to create 3D imagery with the aid of human operators that may guide or correct the operations. Such processes are less expensive and faster than the manual process, but am still typically unsuitable for applications outside of movie and broadcasting studios or the like. Unlike manual or semi-automatic technologies that require human intervention during the conversion process, automatic conversion may provide simple and efficient processes that rely solely on hardware and/or software for the 2D to 3D conversion.

Since there is a broad demand for automatic, real-time conversion of 2D images and video to 3D images and video. Is may be desirable to snake the conversion more accurate and reliable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions, of some elements may be exaggerated relative to other elements for clarity. Further, where considered appropriate, reference labels have been repeated among the figures to indicate corresponding or analogous elements. In the figures.

DETAILED DESCRIPTION

Figure 1:
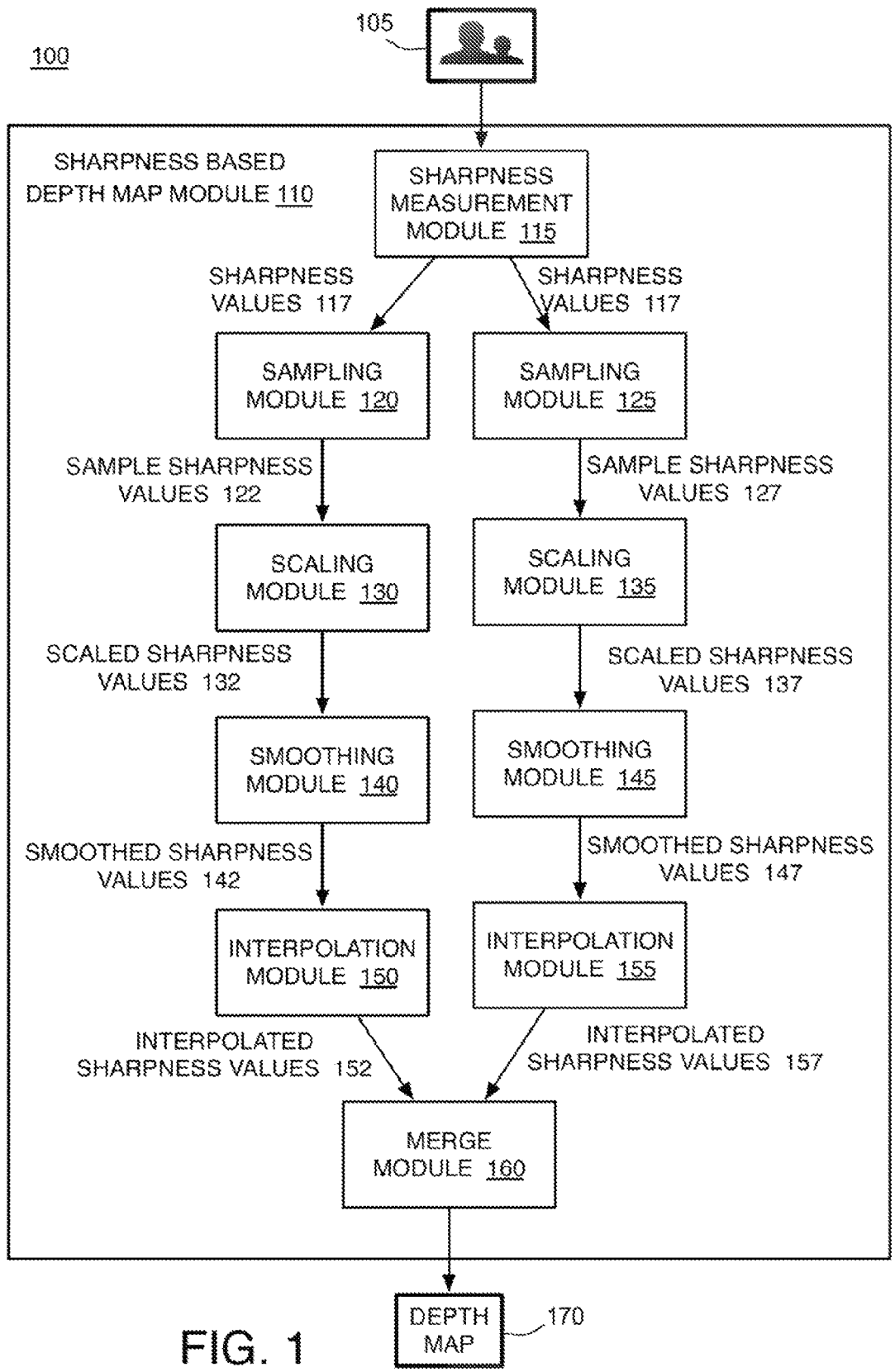
FIG. 1 is an illustrative diagram of an example system for converting a 2-dimensional (2D) image to 3-dimensional (3D) stereo images.

One or more embodiments or implementations, are row described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description, it will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein, may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM): random access memory (RAM): magnetic disk storage media; optical storage media; Slash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below related to real-time automatic conversion of 2-dimensional images or video to 3-dimensional stereo images or video.

As described above, 3D images or video may be generated from 2D image or video using manual, semi-automatic, or automatic techniques. Manual and semi-automatic processes may be relatively expensive in terms of human labor and processing time such that they may only be suitable for implementations where the images or video may be converted prior to presentation to a user.

As is described further below, 2D images or video may be converted to 3D stereo images or video automatically and in real-time. For example, sharpness values for individual pixels of a 2D input image may be determined. The sharpness values may be based, on Y values in a YUV or YCbCr color space or a merge of R/G/B values, for example. In some examples, the sharpness values may be determined based on vertical and horizontal sharpness in a 3×3 window around a pixel. Based on the sharpness values, two region-based samplings may be performed at different resolutions to generate two sets of sample sharpness values. For example the different resolutions may be provided by using different region sizes in the two samplings. Performing the sampling at different resolutions may provide for the extraction of global patterns (e.g., for larger regions) and finer details (e.g., for smaller regions). The sample sharpness values for each region-based sampling may be scaled (i.e., modified to enhance 3D effects) and smoothed (e.g., by applying an averaging filter). The scaled and smoothed sharpness values may be used to interpolate pixel locations that were lost during the sampling such that each region-based sampling may be brought to the full-resolution of the input image. The interpolated sharpness values for each sampling may be merged to generate a depth map.

The depth map and the input image may be used to generate left and right 3D stereo images by converting the depth map to a disparity value map and using the disparity value map to generate the left and right 3D stereo images. Alternatively, the depth map may be further processed by performing vertical and/or horizontal enhancement of depth contrast, ghosting reduction, and, if the images are video frames, temporal filtering to generate an enhanced depth map. Such an enhanced depth map then be used to generate left and right 3D stereo images as discussed. In general, any, all or none of the further processing may be applied to the depth map.

Such techniques may provide automatic and real, time conversion of 2D images or video to 3D stereo images or video. The resultant 3D stereo images or video may be presented to a user for example, FIG. 1 is an illustrative diagram of au example system 100 for convening a 2-dimensional (2D) image to 3-dimensional (3D) stereo images, arranged, in accordance with at least some implementations of the present disclosure. As shown, system 100 may include a sharpness based depth map module 110 having a sharpness measurement module 115, a sampling module 120, a sampling module 125, a scaling module 130, a scaling module 135, a smoothing module 140, a smoothing module 145, an interpolation module 150, an interpolation module 155, and/or a merge module 160. In various implementations, system 100 may be configured to convert a 2D image to 3D stereo images and, in particular, to determine a depth map 170 for a 2D input image 105. As is discussed further below, system 100 may be employed via various software and/or hardware implementations. As is also discussed further below, system 100 may include additional modules, which are not shown in FIG. 1 for the sake of clarity. In various implementations, the illustrated modules may be implemented via central processing unit(s) or graphics processing unit(s), which are discussed further below, but are not shown in FIG. 1. Further, in some examples, system 100 may include additional items that have not been shown in FIG. 1. For example, system 100 may include a radio frequency-type (RF) transceiver, a display, an antenna, a speaker, a microphone, an accelerometer, memory, a router, network interface logic, etc.

As discussed, system 100 may provide for converting a 2D image to 3D stereo images and, in particular, system 100 may provide depth map 170 based on 2D input image 105. As shown, 2D image 105 may be received at sharpness based depth map module 110. In general 2D image 105 may include any suitable image data such as, for example, an image file or a video frame and 2D image 105 may include any number of individual pixels. 2D image 105 may be received at system 100 from an external device or 2D image 105 may be received from another module of system 100 (e.g., from memory stores of system 100).

As shown, sharpness measurement module 115 may determine sharpness values 117, which may be transmitted to sampling module 120 and sampling module 125. Sharpness values 117 may be based on individual pixel values of the individual pixels of 2D image 105. For example sharpness values 117 may be determined based on luma Y values of the individual pixels of 2D image 105 (e.g., if 2D image 105 is represented in the YUV color space or the YCbCr color space) or R/G/B values of the individual pixel of 2D image 105 (e.g., if 2D image 105 is represented in the R/G/B color space). When using R/G/B or other multichannel color spaces, independent measures (e.g., measures for each channel) may be determined and merged to a single measurement using, for example, a MAX operation (i.e., an operation that determines the maximum of the independent measures) or an AVG operation (i.e., an operation that determines an averaged of the independent measures).

Figure 2:
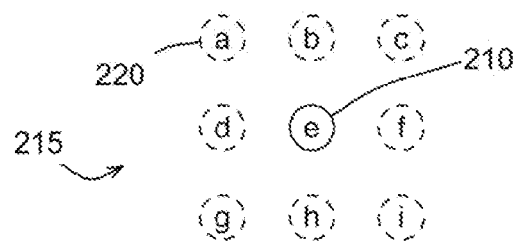
FIG. 2 is an illustrative diagram of an example technique for determining a sharpness value for an individual pixel.

In general, sharpness values 117 may be determined in any suitable manner. FIG. 2 is an illustrative diagram of an example technique for determining a sharpness value for an individual pixel, arranged in accordance with at least some implementations of the present disclosure. As shown in FIG. 2, for an individual pixel 210 (labeled pixel "e"), a pixel window 215 may be considered. As shown, pixel window 215 may be, for example, a 3×3 pixel window and may include neighboring pixels 220 (labeled "a"-"d" and "f"-"i"). In general, pixel window 215 may be any size and the described calculations may be extended to larger pixel windows. To determine a sharpness value for pixel e, a vertical sharpness value and a horizontal sharpness value may be determined. The vertical sharpness value may be determined as an absolute value difference between an absolute value difference of a pixel value of pixel b (i.e., the pixel above pixel e) and a pixel value of pixel e and an absolute value difference of a pixel value of pixel h (i.e., the pixel below pixel e) and the pixel value of pixel e. The horizontal sharpness value may be determined as an absolute value difference between an absolute value difference of a pixel value of pixel d (i.e., the pixel left of pixel e) and a pixel value of pixel e and an absolute value difference of a pixel value of pixel f (i.e., the pixel right of pixel e) and the pixel value of pixel e. The sharpness for individual pixel e may then be determined based on the vertical sharpness and the horizontal sharpness, as a maximum of them or an average of them, for example. Such a determination of sharpness for pixel e is shown in equations (1)-(3) as follows:

$$\text{vertical\_sharpness}(e) = ABS(ABS(b-e) - ABS(h-e)) \quad (1)$$

$$\text{horizontal\_sharpness}(e) = ABS(ABS(d-e) - ABS(f-e)) \quad (2)$$

$$\text{sharpness}(e) = MAX(\text{vertical\_sharpness, horizontal\_sharpness}) \text{ or } AVG(\text{vertical\_sharpness, horizontal\_sharpness}) \quad (3)$$

where vertical_sharpness may be me vertical sharpness, ABS may be an operation that determines an absolute value of the givers value, b, e, h, d, and f may represent pixel values at the described pixel locations, horizontal_sharpness may be the horizontal sharpness, MAX may be an operation that determines a maximum of the given values, and AVG may be an operation that determines an average of the given values.

As discussed, in some examples, a larger pixel window 215 may be considered and, in such examples, the vertical and/or horizontal sharpness measurements may also be extended. Further, in some examples, diagonal sharpness measurements (i.e., similar absolute value differences for pixels a and i and/or e and g) may be considered in determining sharpness values 117.

Returning to FIG. 1, sharpness values 117 may be transmitted to sampling module 120 and sampling module 125. As is discussed further below, sampling module 120, scaling module 130, smoothing module 140, and interpolation module 150 may perform similar operations as sampling module 125, scaling module 135, smoothing module 145, and interpolation module 155, but at different resolutions. The different resolutions may provide for region-based sampling, for example. The results from such processing may be merged at merge module 160 to generate depth map 170. Such different resolutions may be implemented by sampling different region sizes or by sampling the same region sizes over different downscaling factors of the sharpness values, for example.

Figure 3:
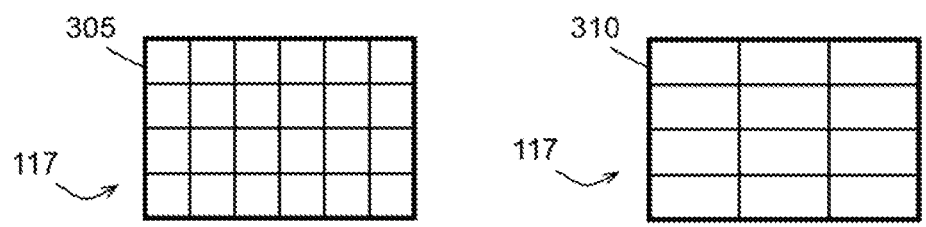
FIG. 3 is an illustrative diagram of example techniques for region-based sampling of sharpness values.

In examples in which different region sizes are utilized, any sizes or shapes of regions may be used. FIG. 3 is an illustrative diagram of example techniques for region-based sampling of sharpness values, arranged in accordance with at least some implementations of the present disclosure. As shown, sharpness values 117 (illustrated generally as blank images for the sake of clarity of presentation) may be divided into sub-regions 305 and sub-regions 310, for example. As shown sub-regions 305 and 310 may be different sizes. In general, sub-regions 305 and 310 may each include non-overlapping sub-regions that may cover all of sharpness values 117. Further, as illustrated in FIG. 3, sub-regions 305 and 310 may be of any suitable shape such as, for example, rectangular or square. The size and/or shape of sub-regions 305 and 310 may be fixed or adaptable based on characteristics of 2D input image 105 and/or sharpness values 117 such as the size or resolution of 2D input image 105 and/or sharpness values 117, for example.

Returning to FIG. 1, sampling module 120 may perform a region-based sampling of sharpness values 117 to determine sample sharpness values 122 and sampling module 125 may perform a region-based sampling of sharpness values 117 (e.g., the same sharpness values as sampled by sampling module 120) to determine sample sharpness values 127. As discussed, in general, sampling modules 120 and 125 may perform the region-based samplings at different resolutions either via sampling at different region sizes or via sampling using different downscaling factors, for example. Further, in examples where different region sizes are used, the sampling values may provide a single value for each sub-region. For example, for a sub-region, the single value may be a maximum sharpness value in the region (i.e., the single value may be MAX(●), where ● represents all of the sharpness values in the pertinent region). In other examples, an average sharpness value for the region may be used. In any event, the region-based sampling may provide a sampling of sharpness values 117 that may reduce the number of subsequent operations (and thereby improving efficiency) and/or provide a smoother representation of the sharpness values. As shown, system 100 may include sampling module 120 and sampling module 125. In other examples, a single sampling module may be used to generate both sample sharpness values 122 and sample sharpness values 127.

As shown, sample sharpness values 122 may be transmitted to scaling module 130 and sample sharpness values 127 may be transmitted to scaling module 135. Scaling module 130 may scale sample sharpness values 122 to generate scaled sharpness values 132. Scaling module 135 may scale sample sharpness values 122 to generate scaled sharpness values 137. The scaling of sample sharpness values may modify them to enhance 3D effects and may be performed using a variety of techniques. For example, a predetermined mapping function may be used or adaptive analysis of sample sharpness values may be performed to determine a mapping function. In some examples, a piecewise-linear mapping may be used, as shown in FIG. 4.

Figure 4:
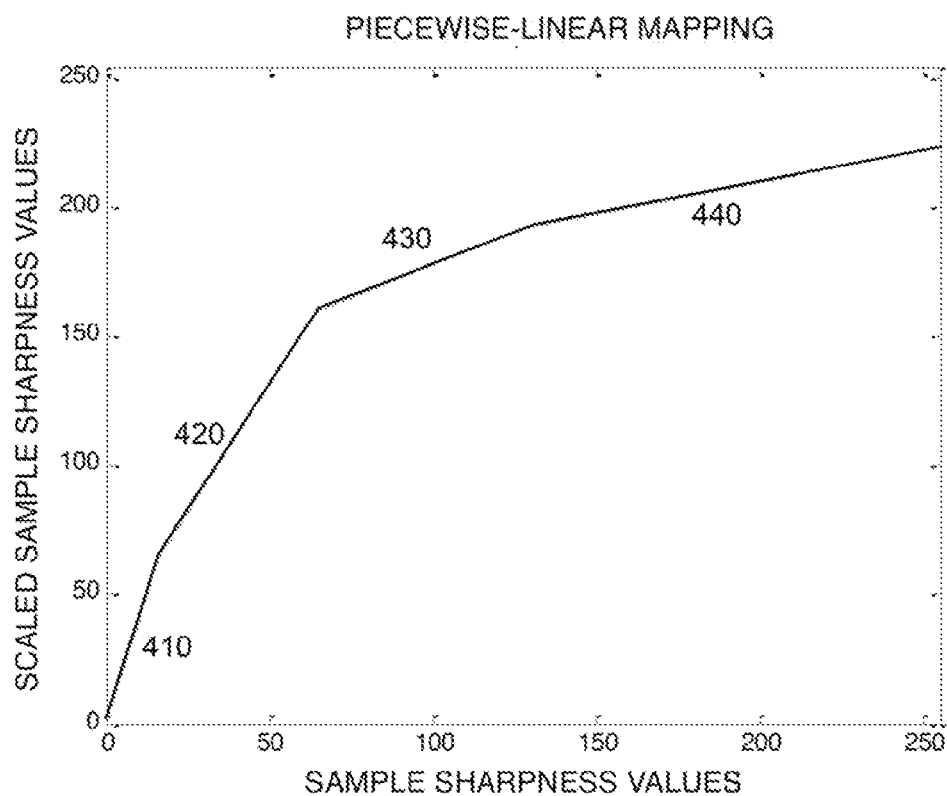
FIG. 4 is as illustrative diagram of example techniques for scaling sharpness values.

FIG. 4 is an illustrative diagram of an example technique for scaling sharpness values, arranged in accordance with at least some implementations of the present disclosure. As shown in FIG. 4, the sample sharpness values may be illustrated along the x-axis and scaled sample sharpness values may be illustrated along the y-axis. As shown, the piecewise-linear mapping may include segments 410, 420, 430, and 440, each of which may provide a linear segment of the piecewise-linear mapping. As shown, the piecewise-linear mapping may provide for larger scaling of small sample sharpness values (e.g., as provided by the large slope of segment 410) while larger sample sharpness values may be scaled by a smaller amount (e.g., as provided by the small slope of segment 440). Such a piecewise-linear mapping may provide an increase in depth gap between less sharp (e.g., blurry and typically background) areas and more sharp (e.g., typically foreground) areas while reducing a depth gap within less sharp and more sharp areas. The example of FIG. 4 may be shown as follows equation (4):

$$\text{if (sharp\_in} < 16) \text{ sharp\_out} = 4*\text{sharp\_in} + 0; \quad (5)$$

$$\text{else if (sharp\_in} < 64) \text{ sharp\_out} = 2*\text{sharp\_in} + 32;$$

$$\text{else if (sharp\_in} < 128) \text{ sharp\_out} = \frac{1}{2}*\text{sharp\_in} + 12\%;$$

$$\text{else sharp\_out} = \frac{1}{4}*\text{sharp\_in} + 160; \quad (4)$$

where sharp_in may be a sample sharpness value, sharp_out may be a scaled sample sharpness value. The relationship illustrated by equation (4) may be represented by the 4 triplets of parameters as shown in equation (5):

$$\{threshold, scale, offset\} = \{16, 4, 0\} \quad (5)$$

$$\{64, 2, 32\}$$

$$\{128, \tfrac{1}{2}, 128\}$$

$$\{256, \tfrac{1}{4}, 160\}$$

where Threshold may be a threshold at which a scaling factor changes, scale may be a scaling factor, and offset may be the offset for the pertinent segment. The above threshold, scale, and offset may be predetermined values or they may be based on characteristics of 2D input image 105, sharpness values 117, or sample sharpness values 122 or 127. As shown, system 100 may include scaling module 130 and scaling module 135. In other examples, a single scaling module may be used to generate both scaled sharpness values 132 and scaled sharpness values 137.

In another example, scaled sharpness values 132 may be determined using adaptive adjustment. For example, sample sharpness values 122 may be analyzed with histogram of sharpness values in 2D input image 105. In such examples, blurry regions (e.g., background regions) and sharp regions (e.g., foreground regions) may be identified as separate clusters of sharpness values in a histogram. The identified clusters may be scaled such that the blurry regions become blurrier and sharp regions become sharper, resulting in a larger separation of the two regions.

As shown, scaled sharpness values 132 may be transmitted to smoothing module 140 and scaled sharpness values 137 may be transmitted to smoothing module 145. Smoothing module 140 may smooth scaled sharpness values 132 to generate smoothed sharpness values 142 by, for example, applying a 3×3 averaging filter. Smoothing module 145 may smooth scaled sharpness values 137 to generate smoothed sharpness values 147 by, for example, applying a 3×3 averaging filter. The size of the averaging filter applied by either smoothing module 140 or smoothing module 145 may be a different size such as 4×4 or 5×5 or the like. Further the size of the averaging filter may be predetermined or it may be determined based on the received scaled sharpness values. As shown, system 100 may include smoothing module 140 and smoothing module 145. In other examples, a single smoothing module may be used to generate both smoothed sharpness values 142 and smoothed sharpness values 147.

As shown, smoothed sharpness values 142 may be transmitted to interpolation module 150 and smoothed sharpness values 147 may be transmitted to interpolation module 155. Interpolation module 150 may determine interpolated sharpness values 152 based on smoothed sharpness values 142. Interpolation module 155 may determine interpolated sharpness values 157 based on smoothed sharpness values 147. The interpolated sharpness values may be generated using any interpolation technique such as, for example, bilinear interpolation techniques. In general, interpolation modules may provide interpolated sharpness values 152 and 157 at the same resolution (i.e., with the same number of pixels) for subsequent merging. Further, in some examples, the resolution of interpolated sharpness values 152 and 157 may match the resolution of 2D input image 105 (e.g., they may have the same pixel count) such that the smoothed sharpness values may be brought back to the full resolution of 2D input image 105. In some examples, interpolated sharpness values 152 and 157 may each be considered a depth surface such that they include depth information based on 2D input image 105.

As shown, system 100 may include interpolation module 150 and interpolation module 155. In other examples, a single interpolation module may be used to generate both interpolated sharpness values 152 and interpolated sharpness values 157.

As shown, interpolated sharpness values 152 and 157 may be transmitted to merge module 160. Merge module 160 may merge interpolated sharpness values 152 and 157 to generate depth map 170. Depth map 170 may include depth values associated with 2D input image 105, for example. As is discussed further below, depth map 170 and 2D input image 105 may be used to generate 3D stereoscopic images. In general, merge module 160 may merge interpolated sharpness values 152 and 157 based on a blending factor (or "blend ratio" or "merge ratio"), which may be a predetermined factor or determined dynamically based on interpolated sharpness values 152 and 157, for example. The merge ratio may be the same for each pixel location, it may be determined dynamically at each pixel location, or uniform over a region of pixels and changed at region boundaries, or the like. An example merge operation is shown in equation (6) below:

$$depth = alpha \times depth1 + (1-alpha) \times depth2 \quad (6)$$

where depth may be a depth value in the depth map, alpha may be the blending factor normalized in the range [0, 1], depth1 may the depth surface (or map) represented by interpolated sharpness values 152, and depth2 may the depth surface (or map) represented by interpolated sharpness values 157.

As discussed, sampling module 120, scaling module 130, smoothing module 140, and interpolation module 150 may perform similar operations as sampling module 125, scaling module 135, smoothing module 145, and interpolation module 155 but at different resolutions. In some implementations, the modules may be implemented separately while in other implementations, the modules may be implemented as single modules that may perform the functions for the different resolutions as described. That is, a single sampling module, a single scaling module, a single smoothing module, and a single interpolation module may be provided and the operations at different resolutions may be performed at the same modules (in serial for example). Such implementations may operate slower than parallel implementations but may offer the advantages of ease of implementation and reduced silicon area, for example.

Figure 5:
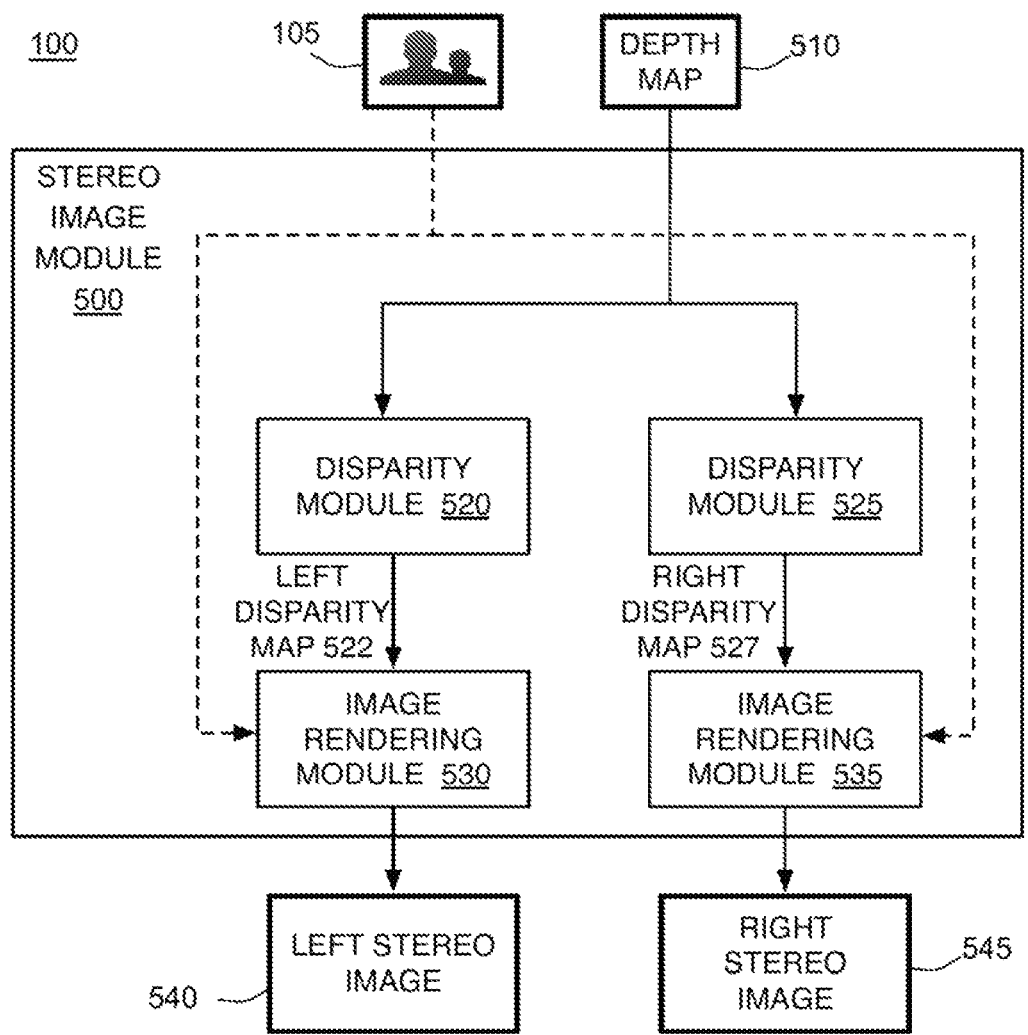
FIG. 5 is an illustrative diagram, of art example system, for converting a 2-dimensional (2D) image to 3-dimensional (3D) stereo images.

As discussed, depth map 170 may be used to generate 3D stereoscopic images based on 2D input image 105. FIG. 5 is an illustrative diagram of an example system for converting a 2-dimensional (2D) image to 3-dimensional (3D) stereo images, arranged in accordance with at least some implementations of the present disclosure. As shown, system 100 may further include a stereo image module 500 including a disparity module 520, a disparity module 525, an image rendering module 530, and an image rendering module 535. As shown, stereo image module 500 may receive 2D input image 105 and depth 510 and generate a left stereo image 540 and a right stereo image 545.

As shown in FIG. 5, 2D input image 105 and depth map 510 may be received at a stereo image module of system 100. In general, 2D image 105 and depth map 510 may fee received at system 100 from an external device or 2D image 105 and/or depth map 510 may be received from another module of system 100 (e.g., from memory stores of system 100 or from sharpness based depth map module 110, or the like). In some examples, depth map 510 may be depth map 170. In other examples, depth map 510 may be an enhanced depth map, as is discussed further below.

As shown, disparity module 520 may receive depth map 510 and generate a left disparity value map 522. Disparity module 525 may receive depth map 510 and generate aright disparity value map 527. Left disparity map 522 may be transmitted to image rendering module 530 and right disparity map 527 may be transmitted to image rendering module 535. Disparity module 530 may also receive 2D input, image 105 and may generate left stereo image 540 based on 2D input image 105 and left disparity map 522. Also as shown, disparity module 530 may receive 2D input image 105 and may generate right stereo image 545 based on 2D input image 105 and right disparity map 527. In general, left stereo image 540 and right stereo image 545 may be 3D stereo images suitable for display to a user.

Figure 6:
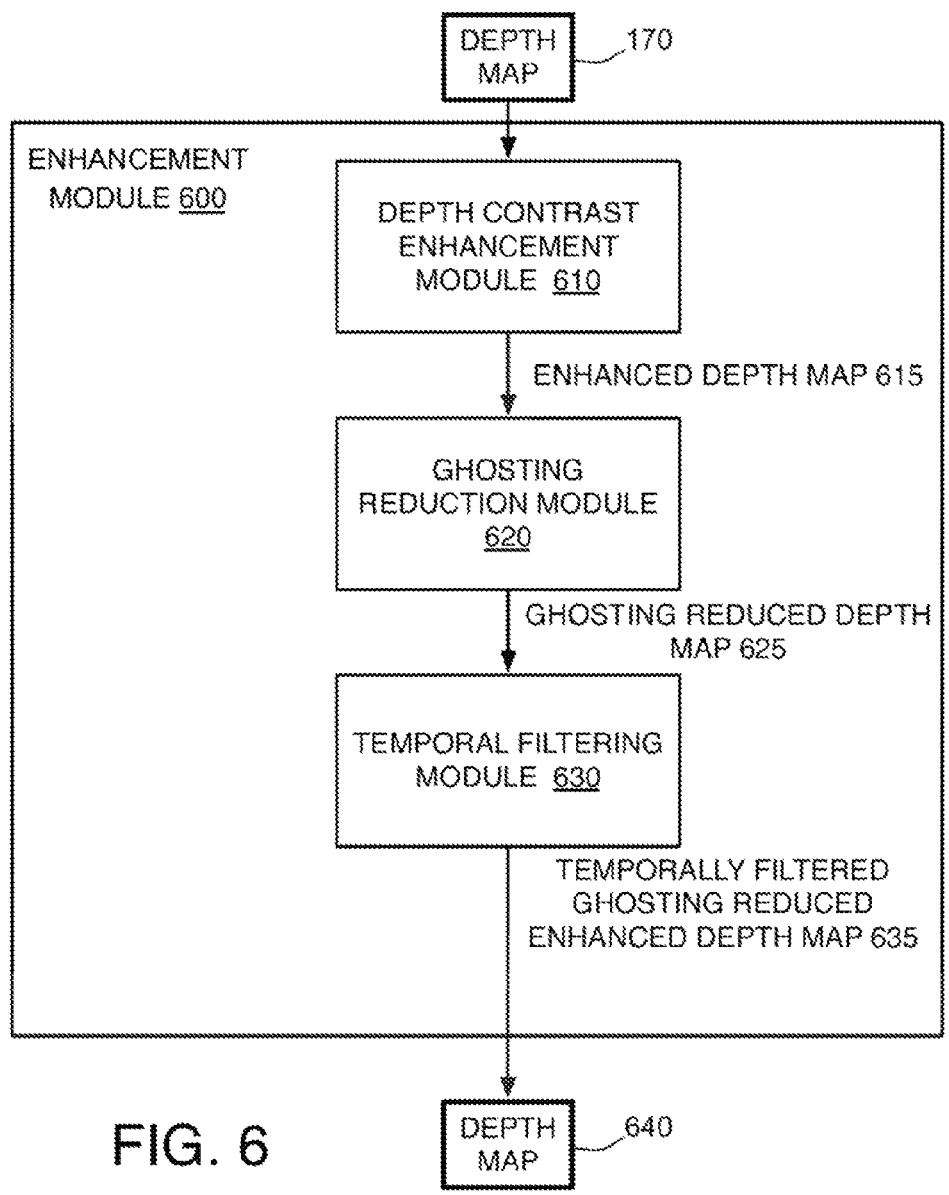
FIG. 6 is an illustrative diagram of an example system for converting a 2-dimensional (2D) image to 3-dimensional (3D) stereo images.

As discussed, depth map 170 or an enhanced depth map may be used to generate 3D stereo images. FIG. 6 is an illustrative diagram of an example system for generating an enhanced depth map, arranged in accordance with at least some implementations of the present disclosure. As shown, system 100 may farther include an enhancement module 600 that may include one or more of a depth contrast enhancement module 610, a ghosting reduction module 620, and a temporal filtering module 630. Enhancement module 600 may receive depth map 170 and generate a depth map 640. In some examples, depth map 640 may be considered or labeled an enhanced depth map. As shown, in an example, each of modules 610, 620, and 630 may be utilized to generate depth map 640. In various implementations, one or combinations of modules 610, 620, and/or 630 may be utilized to generate depth map 640.

As shown, depth map 170 may be received at depth contrast enhancement module 610, which may perform an enhancement of depth contrast on depth map 170 to generate enhanced depth map 615. In general, the enhancement of depth contrast may include a vertical enhancement, a left-to-right and/or right-to-left horizontal enhancement or a combination thereof. For example, the enhancement of depth contrast may include only a vertical enhancement. In another example, the enhancement of depth contrast may include performing, in parallel, a vertical enhancement, a left-to-right horizontal enhancement, and a right-to-left horizontal enhancement on the depth map, and combining the vertical, the left-to-right, and the right-to-left horizontal enhancement to generate the enhanced depth map. In yet another example, the enhancement of depth contrast may include performing a vertical enhancement and subsequently performing a left-to-right horizontal enhancement and a right-to-left horizontal enhancement to generate the enhanced depth map.

In general, the discussed enhancements may emphasize depth discontinuities at object boundaries in depth map 170 without performing object segmentation. For example, a vertical enhancement may include looking at pixel values across two successive rows along the same column. If the pixel values are constant (e.g., within a threshold), the smaller depth value may be applied to both pixel locations. As the process may continue down the depth map from, top to bottom, smaller depth values may propagate vertically until there is a jump or fall (i.e., a pixel value comparison exceeds a threshold as either an increase or decrease in depth). Such a jump or fall may then propagate until there is another jump or tall, and so on. Such an implementation may emphasize depth discontinuities in the vertical direction. Similar techniques may be performed for left-to-right and right-to-left horizontal enhancements, for example.

Substantially repeating, the above example, the vertical enhancement may be described as follows. A pixel value of a pixel at a row, N and a column, M, of the depth map may be compared to a pixel value of a pixel at a second row, N+1, and the column, M, of the depth map (e.g., column N is above N+1) such that the row count increases toward the bottom of the depth map and a difference between the pixels may be determined and compared to a threshold. If the difference is within the threshold, the pixel values may both be set to the smaller of the pixel values. If the difference is not within the threshold, no changes may be made to the pixel values. Such a procedure may be propagated down the depth map as discussed and may be performed for each pixel in the depth map, for example.

As discussed, in some examples, if a difference is within a threshold, the pixel values may be set to the smaller of the pixel values. In another example, edges may be used to generate blending factors to modify the pixel values. An example of such a technique is shown in equation (7) as follows:

$$\text{depth} = (1-\text{alpha}) \times \text{MIN}(\text{prev},\text{curr}) + \text{alpha} \times \text{MAX}(\text{prev}, \text{curr}) \quad (7)$$

where depth may be an enhanced depth value for a pixel alpha may be a blending factor normalized over the range [0, 1], curr may be the current depth value for the pixel prev may be the depth, value for the pixel above curr, MIN may be an operation that determines a minimum of the given, values, and MAX may be an operation that determines a minimum of the given values.

In an implementation of this method, a lower threshold L and an upper threshold H may be used to clamp the blending factor alpha derived from edge magnitude edge. The edge magnitude edge may also be modified by a p-bit right bit-shift operation. For example, alpha may be computed from the edge magnitude by the following equation (8):

$$\text{alpha} = \text{CLAMP}[\text{edge} \gg p, L, H], \text{ where } L = [0, 8] \text{ and } H = [0, 8] \quad (8)$$

where CLAMP may be an operation that clamps the factor, >> may be a shift tight operation by a bit count p, L may be a lower bound threshold, and H may be an upper bound threshold. Then, the enhanced depth value may be computed as shown in equation (9):

$$\text{depth} = [(8-\text{alpha}) \times \text{MIN}(\text{prev},\text{curr}) + \text{alpha} \times \text{MAX}(\text{prev}, \text{curr})]/8 \quad (9).$$

In a similar manner, left-to-right and/or right-to-left horizontal enhancement(s) may be performed. In horizontal enhancements, the column location of a pixel may be held constant while the row location may be changed and evaluated. Such implementations may emphasize depth discontinuities at object boundaries and particularly object boundaries that extend vertically.

As shown, enhanced depth map 615 may be transmitted to ghosting reduction module 620, which may perform a ghosting reduction on enhanced depth map 615 to generate ghosting reduced depth map 625. In general, ghosting in 3D stereo display may be caused by crosstalk between left-view and right-view image pixels in a stereo pair. In some examples, the ghosting reduction may be performed by shifting the depth map by a depth offset to shift either away from or toward a zero-parallax screen. In general, such a shift may cause sharp and/or high contrast, edges to be placed on or near the zero-parallax screen, which may reduce ghosting effects for a viewer. In other examples, the ghosting reduction may be performed by modifying brightness values of the enhanced depth map to reduce sharpness and/or contrast, at edges within the enhanced depth map. In such examples, the brightness modification may be varied depending on whether the pixel is at or near an edge. Brightness modifications may cause less contrast for a viewer and therefore, less ghosting effects. As discussed, in some examples, ghosting reduction module may instead receive depth map 170 for processing, in other examples, enhanced depth map 615 may be transmitted to stereo image module 500 to generate left and right 3D stereo images.

As shown, ghosting reduced depth map 625 may be transmitted to temporal filtering module 630, which may perform a temporal filtering on ghosting reduced enhanced depth map 625 and a second ghosting reduced enhanced depth map (not shown) temporally preceding the ghosting reduced enhanced depth map by a time, t, to generate a temporally filtered ghosting reduced enhanced depth map 635. In some examples, in particular, when images (as opposed to video frames) are being processed, temporal filtering module 630 may be skipped. In general, in video processing, it may be desirable to have sequenced frames be substantially consistent in depth values so the presentation to a viewer is smooth. The described, temporal filtering may provide for stabilizing effects for any fluctuations in depth values due to random noise, compression artifacts, outliers, or the like. In some examples, depth values of ghosting reduced enhanced depth map 625 may be modified based on a weighting factor based on an absolute value difference between a depth value in ghosting reduced enhanced depth map 625 and a depth value in the second ghosting reduced enhanced depth map. In general, either finite impulse response (FIR) or infinite impulse response (OR) approaches may be used. In FIR implementations, a depth value may be calculated as shown in equation (10) as follows;

$$\text{depth\_out}(t) = (\text{alpha}) \times \text{depth\_in}(t) + (1 - \text{alpha}) \times \text{depth\_in}(t-1) \quad (10)$$

and in HR implementations, a depth value may be calculated as shown in equation (12) as follows:

$$\text{depth\_out}(t) = (\text{alpha}) \times \text{depth\_in}(t) + (1 - \text{alpha}) \times \text{depth\_out}(i-1) \quad (12)$$

where depth_out may be the modified depth value, t may be the current time (frame), t−1 may be the preceding time (frame), alpha may be the weighting factor, depth_in may be the original depth value, and, in some examples, weighting factor, alpha, may be determines as shown in equation (13) as follows:

$$\text{alpha} = ABS(\text{depth\_in}(t) - \text{depth\_in}(t-1)) \text{ or}$$

$$\text{alpha} = ABS(\text{depth\_in}(t) - \text{depth\_out}(t-1)) \quad (13)$$

where ABS may determine an absolute value of the given value. In other examples, weighting factor, alpha, may be determines as shown in equation (14) as follows:

$$\text{alpha} = ABS(\text{input\_pixel}(t) - \text{input\_pixel}(t-1)) \quad (14)$$

where input_pixel may include luma (Y), chroma (Cb/Cr), or tricolor (R/G/B) values from a single pixel location or multiple pixel locations. When determined from multiple pixel locations, any operation such as MAX (i.e., an operation which determines a maximum of given values), MIN (i.e., an operation which determines a minimum of given values), AVG (i.e., an operation which determines an average of given values), or MEDIAN (i.e., an operation which determines a median of given values) may be used to combine multiple pixel values to one. In yet another example, alpha may be determined as follows using equation (15):

$$\text{alpha} = ABS(\text{depth\_in}(t) - \text{depth\_in}(t-1)) \diamond ABS(\text{input\_pixel}(t) - \text{input\_pixel}(t-1)) \quad (15)$$

where ⬥ is any of operation MAX, MIN, AVG, or MEDIAN. In another example, alpha may be determined using a piecewise linear mapping on the level of current depth, the level of absolute temporal difference or depth, or on multiple past depth values in the local neighborhood (i.e., the pixels surrounding the pixel of interest) as discussed above with respect, to FIG. 4.

As discussed, the above processing, or a portion thereof, may be used to generate depth map 640. Depth map 640 may thereafter be used to generate 3D stereo images such as a left-view stereo image and a right-view stereo image. The 3D stereo images may be based on 2D input image 105 and depth map 640 and the left-view stereo image and the right-view stereo image may be generated by converting the depth map to a disparity value map and determining the left-view stereo image and the right-view stereo image based on the disparity value map and 2D input image 105. Such techniques are discussed above with respect to FIG. 5 and will not be repeated for the sake of brevity. As discussed, the techniques discussed with respect to FIG. 5 may be implemented using any depth map discussed herein including, for example, depth map 640.

As discussed, a 2D input image may be used to generate a depth map, which may be enhanced in some examples. The enhanced depth map may be used, along with the 2D input image to generate left- and right-stereo images for presentation to a user.

Figure 7:
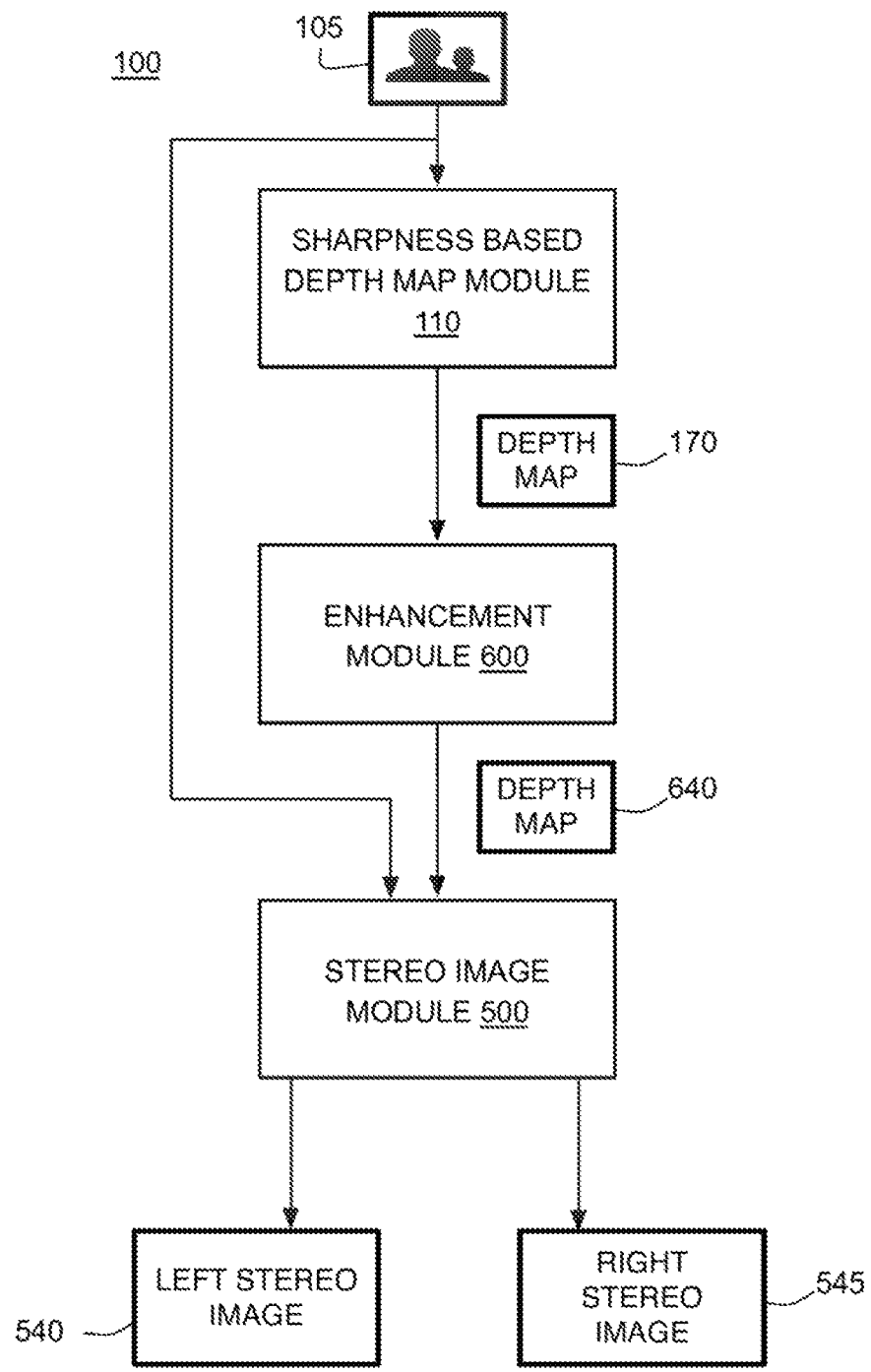
FIG. 7 is an illustrative diagram of art example system for converting a 2-dimensional (2D) image to 3-dimensional (3D) stereo images.

FIG. 7 is an illustrative diagram of an example system for converting a 2-dimensional (2D) image to 3-dimensional (3D) stereo images, arranged in accordance with at least some implementations of the present disclosure. As shown in FIG. 7, 2D input image 105 may be received at sharpness based depth map module 110, which may generate depth map 170, as discussed with respect to FIG. 1. As shown, depth map 170 may be transmitted to enhancement module 600, which may generate depth map 640 (e.g., an enhanced depth map) as discussed with respect to FIG. 6. Enhanced depth map 640 and 2D input image 105 may be transmitted to stereo image module 500, which may generate left stereo image 540 and right stereo image 545 as discussed with respect to FIG. 5. Left stereo image 540 and right stereo image 545 may represent a 3D stereo image and may be presented to a user. As will be appreciated, the system and process represented in FIG. 7 may include any combination of the implementations discussed herein. Those details will not be repeated for the sake of brevity.

Figure 8:
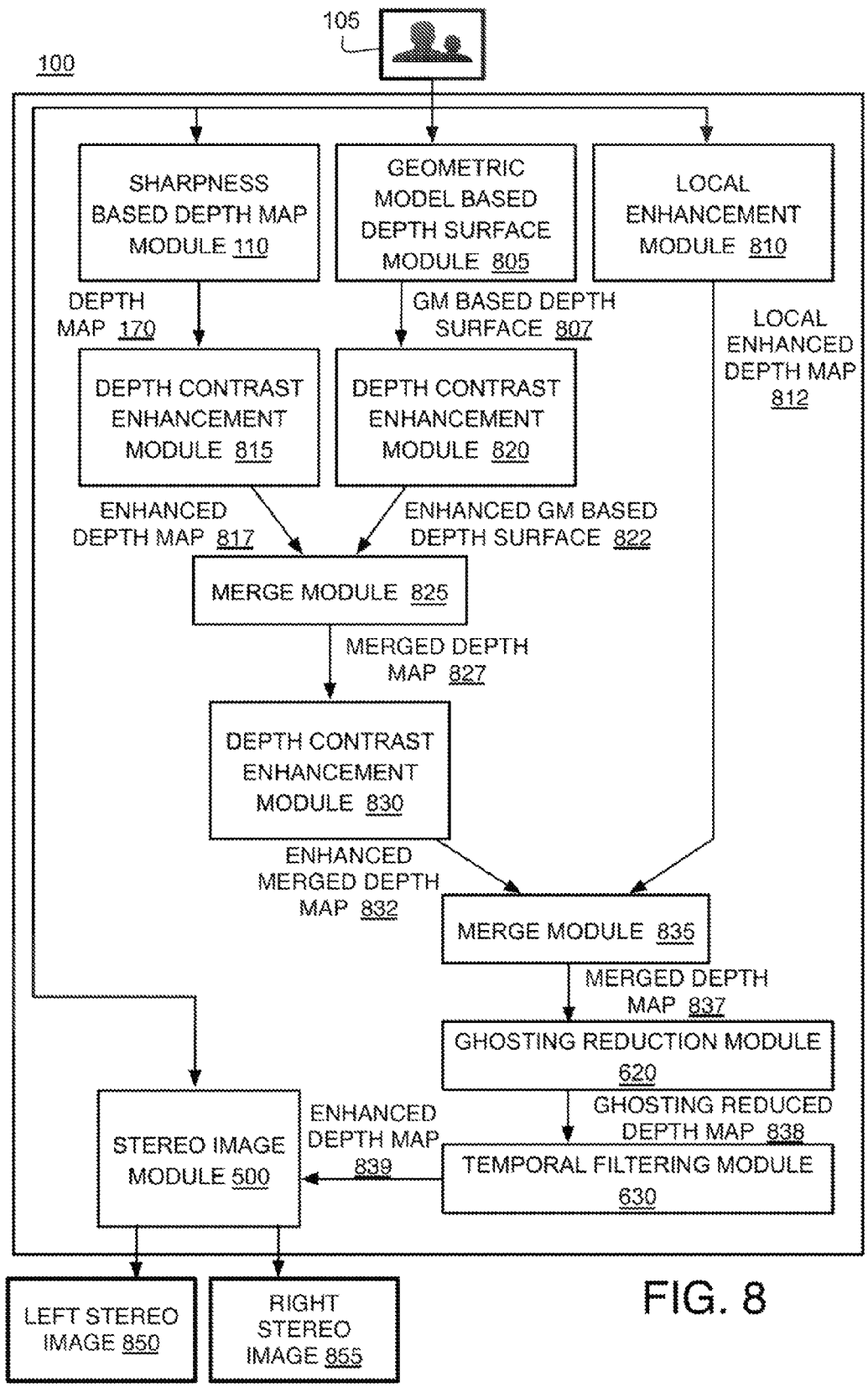
FIG. 8 is an illustrative diagram of an example system for conversing a 2-dimensional (2D) image to 3-dimensional (3D) stereo images.

FIG. 8 is an illustrative diagram of an example system for converting a 2-dimensional (2D) image to 3-dimensional (3D) stereo images, arranged in accordance with at least some implementations of the present disclosure. As shown, system 100 may include sharpness based depth map module 110, geometric model based depth surface module 805, local enhancement module 810, depth contrast enhancement module 815, depth contrast enhancement module 820, merge module 825, depth contrast enhancement module 830, merge module 835, ghosting reduction module 620, temporal filtering module 630, and stereo image module 500. As shown, system 100 may receive 2D input image 105 and generate left stereo image 850 and right stereo image 855.

As shown, 2D input image 105 may be received at sharpness based depth map module 110, which may generate depth map 170. Sharpness based depth map module 110 may generate depth map 170 by any of the techniques discussed herein and, in particular, with respect to FIG. 1, which will not be repeated for the sake of brevity. 2D input image 105 may also be received at geometric, model based depth surface module 805, which may generate a depth surface 807. In some examples, depth surface 807 may be considered a geometric model based depth surface.

Geometric model based depth surface module 805 may generate the geometric model based depth surface 807 by determining a top-to-bottom depth map associated with 2D input image 105. The top-to-bottom depth map may include a plurality depth values constant across respective rows of the top-to-bottom depth map that may increase from a top of the top-to-bottom depth map to a bottom of the top-to-bottom depth map. Further, one or more edges in 2D input image 105 may be determined. In some examples, the edges may be determined by comparing pixel value differences between row pairs of pixels of the 2D input image to a threshold, as is discussed further below. In other examples, the edges may be determined by applying Sobel operators. Determining the one or more edges may provide one or more blending factor associated with the edges, as is also further discussed below. The top-to-bottom depth map may be modified by the one or more blending factors to generate geometric model based depth surface 807.

As discussed, a top-to-bottom depth map may be determined associated with 2D input image 105. In some examples, the top-to-bottom depth map may generally be formed by a technique chosen independently of the content of 2D input image 105. For example, the top-to-bottom depth map may be formed by assigning a single depth value to the entire horizontal pixel locations (i.e., a single row) of the depth surface. The depth values may increase gradually in successive rows from top to bottom. For example, to distribute a full range of depth values evenly, the depth values may be assigned as shown in equation (16) as follows:

$$\text{depth}(r) = \text{FLOOR}((2^N/h) \times r) \quad (16)$$

where depth may be an N-bit depth value, r may be a row designation. FLOOR may be an operation that returns a rounded down value and may provide same depth value for a number of rows (e.g., 4 or 5 rows), and h may be height of the depth surface. For example, if N=8 hits and h=1080 rows, equation (16) may assign the same depth value to either 4 or 5 consecutive rows due to the FLOOR( ) operation. Alternatively, a single depth value may be assigned to the same number of rows across all rows, using equation (17) as follows:

$$\text{depth}(r) = \text{FLOOR}(r/\text{CEIL}(h/2^N)) \quad (17)$$

where CEIL, is an operation that provides a rounded up value. Using equation (17), for example, with N=8 hits and h=1080 rows, depth values of [0, 215] are assigned such that the same depth value is assigned to each set of 5 consecutive rows. Such an implementation may not utilize the full range [0, 255] of 8-bit depth values, but may be advantageous for software or hardware implementations. As described, all input pictures (i.e., 2D input image 105) may be assigned the same range of depth values for the top-to-bottom geometric model regardless of the content, of 2D input image 105. In some examples, scaling of depth values via multiplication or division operations may be used to fit the depth values to the N-bit range, for example, if the depth values are computed adaptively from the input pixel values. In general the discussed techniques may provide for a simplified generation of the discussed top-to-bottom depth map.

As discussed, the top-to-bottom depth map may be modified by the one or more blending factors to generate geometric model based depth surface 807. Generating the blending factors may include determining one or more edges in 2D input image 105 and determining blending factors associated with the one or more edges. In some examples, the edges may be determined by comparing pixel value differences between row pairs of pixels of the 2D input image to a threshold. For example, edges may be determined from 2D input image 105 based on successive rows and used as the blending factor alpha between two vertically neighboring depth values. This may be performed along the vertical direction for the top-to-bottom geometric model, for example. In some examples, edges may be determined across each successive pairs of rows (r, r+1), (r+1, r+2), . . . , and (r+R−1, r+R) as shown in equation (18) as follows:

$$\text{edge1} = ABS(\text{input\_pixel}(c, r+0) \ldots \text{input\_pixel}(c, r+1));$$

$$\text{edge2} = ABS(\text{input\_pixel}(c, r+1) - \text{input\_pixel}(c, r+2));$$

$$\ldots$$

$$\text{edge}R = ABS(\text{input\_pixel}(c, r+R-1) - \text{input\_pixel}(c, r+R));$$

where edge may be a determined edge, ABS may be an operation mat returns an absolute value of a given value, input_pixel may be an input pixel value, c may be a column location, r may a row location.

In other examples, Sobel operators or other edge operators may be used to determine edges within 2D input image 105. The discussed blending factor may be determined based on edge magnitudes using operations MAX, MIN, AVG, or MEDIAN. Using MAX for the purposes of example, alpha may be determined using equation (19) as follows:

$$\text{alpha} = \text{MAX}(\text{edge1}, \text{edge2}, \text{edge3}, \ldots, \text{edge}R) \quad (19)$$

where alpha may be the blending factor.

As discussed, the top-to-bottom depth map may be modified based on the blending factor(s) to generate geometric model based depth surface 807. For example, the depth values of the top-to-bottom depth may be modified as shown in equation (20) as follows:

$$\text{depth}(r) = \text{alpha} \times \text{MIN}(\text{prev}, \text{curr}) + (1-\text{alpha}) \times \text{MAX}(\text{prev}, \text{curr}) \quad (20)$$

where curr is the depth value of the current pixel location and prev is the depth value of vertically previous pixel location (i.e., row above). In some examples, when applying the top-to-bottom model, the depth value in prev is always smaller than the depth value curr such that MIN(prev, curr)=prev and MAX(prev, curr)=curr.

As shown, depth map 170 may be transmitted to depth contrast enhancement module 815. Depth contrast enhancement module 815 may generate enhanced depth map 817. In some examples, enhanced depth map 817 may be generated by performing a vertical enhancement of depth contrast on depth map 170. Such a vertical enhancement may be performed using any techniques discussed herein and, in particular, the techniques discussed with respect to FIG. 6. Also as shown, geometric model based depth surface 807 may be transmitted to depth contrast enhancement module 820. Depth contrast enhancement module 820 may generate enhanced geometric model based depth surface 822. In some examples, enhanced geometric model based depth surface 822 may be generated by performing a vertical enhancement of depth contrast on depth contrast enhancement module 820. Such a vertical enhancement may be performed using any techniques discussed herein and, in particular, the techniques discussed with respect to FIG. 6.

As shows in FIG. 8, enhanced depth map 817 and enhanced geometric model based depth surface 822 may be transmitted to merge module 825. Merge module 825 may merge enhanced depth map 817 and enhanced geometric model based depth surface 822 to generate a merged depth map 827.

Such a merge may be performed using any techniques discussed herein and, in particular, the techniques discussed with respect to FIG. 1 at merge module 160.

As shown, merged depth map 827 may be transmitted to depth contrast enhancement module 830. Depth contrast enhancement module 830 may generate enhanced merged depth map 832. In some examples, enhanced merged depth map 832 may be generated by performing a horizontal enhancement of depth contrast on merged depth map 827. Such a horizontal enhancement may be performed using any techniques discussed herein and, in particular, the techniques discussed with respect to FIG. 6.

As shown in FIG. 8, 2D input image 105 may be transmitted to local enhancement module 810. Local enhancement module 810 may perform edge-based and luma-based local enhancement on the 2D input image to generate a local enhanced depth map 812, which may be merged or blended with enhanced merged depth map 832 at merge module 835. In some examples, local enhanced depth map 812 may include depth_final values. For example, edge-based enhancement may include determining edges in 2D input image 105. The edges may be determined by applying a 3×3 vertical Sobel edge operator, applying a 3×3 horizontal Sobel edge operator, determining a maximum of the determined vertical and horizontal edges, for example. The determined edges may be applied as edge-based enhancements to 2D input image 105. Further luma-based local enhancements may be applied as follows. For example, the determined edges and luma may be modified by non-linear scaling and clipping operations. An example of such operations is shown in equations (21)-(23) as follows:

$$\text{delta\_edge} = (\text{edge} < THR) 0 : \text{MIN}(\text{edge}/Z, E) \quad (21)$$

$$\text{delta\_luma} = \text{MAX}(\text{MIN}(\text{luma}/Z) - \text{OFFSET}, HI), LO); \quad (22)$$

$$\text{depth\_final} = \text{MAX}(\text{MIN}(\text{depth\_global} * \text{delta\_edge} + \text{delta\_luma}, 255), 0); \quad (23)$$

where the result of local enhancement may be stored as 8-bit depth values in depth_final, the contribution from the edges may be stored as delta_edge, and the contribution from brightness may be stored as delta_luma, and the parameter set (THR, Z, E, Offset, HI, LO) may be programmable based on the implementation.

As shows in FIG. 8, enhanced merged depth map 832 and local enhanced depth map 812 may be transmitted to merge module 835. Merge module 835 may merge enhanced merged depth map 832 and local enhanced depth map 812 to generate a merged depth map 837. Such a merge may be performed using any techniques discussed herein and, in particular, the techniques discussed with, respect to FIG. 1 at merge module 160. Further, merged depth map 837 may be transmitted to ghosting reduction module 620, which may generate a ghosting reduced depth map 838. Such ghosting reduction may be performed using any techniques discussed herein and, in particular, the techniques discussed with respect to FIG. 6. Ghosting reduced depth map 838 may be transmitted to temporal filtering module 630, which may generate enhanced depth map 839 based on ghosting reduced depth map 838 and a second ghosting reduced enhanced depth map temporally preceding the ghosting reduced depth snap by a time, t, for example. Such temporal filtering may be performed using any techniques discussed herein and, in particular, the techniques discussed with respect to FIG. 6.

As shown, enhanced depth map 839 may be transmitted to stereo image module 500. Also as shown, 2D input image 105 may be transmitted to stereo image module 500. Stereo image module 500 may generate left stereo image 850 and right stereo image 855 using any of the techniques discussed herein and, in particular, the techniques discussed with respect to FIG. 5. Left stereo image 850 and right stereo image 855 may be presented to a user who may experience a 3D effect from the images.

As discussed, in some examples, a top-to-bottom geometric model may be used. Such a model may be suitable for many natural scenes. However, some example 2D input images may not be suitable for the top-to-bottom geometric model. In some examples, it may be desirable determine how suitable the top-to-bottom model may be for a given 2D input image. Such a determination may be made using content histograms of pixel values and edge magnitudes from the 2D input image. For example, it may be assumed that the top-to-bottom model is more suitable if the picture content of the 2D input image varies in terms of luma, chroma, and/or edge, magnitudes between top and bottom portions of the input picture. For example, if site top and bottom portions contain similar colors, it may be less likely that the top-to-bottom model is suitable. Similarly, if edge magnitudes are large only in the top or the bottom portions, it may be more likely that the top-to-bottom model fits well. In some examples, a histogram based approach may implement these concepts. For example, four histograms may be created and compared as follows. The pixel values, such as luma, for example, from the top 1/N portion of the 2D input image may be collected into a histogram, hist_pixel_top. The pixel values from the bottom 1/N portion of the input picture may be collected into a histogram, hist_pixel_bot. The edge magnitudes from the top 1/N portion of the input picture may be collected into a histogram, hist_edge_top. The edge magnitudes from the bottom 1/N portion of the input picture are collected into a histogram, hist_edge_bot. The value of N may be a fixed preset, value or it may be determined adaptively based, on the 2D input image.

Histograms hist_pixel_top and hist_pixel_bot may be compared, for example, by computing sum of absolute differences (SAD) of the two histograms and histograms hist_edge_top and hist_edge_bot may be compared in a similar manner. The similarity of the histograms may be normalized into two quantities similarity_pixel and similarity_edge using a normalization factor γ as shown in equation (24) and (25) as follows:

$$\text{similarity\_pixel} = \gamma \cdot \text{SAD}(\text{hist\_pixel\_top} - \text{hist\_pixel\_bot}) \quad (24)$$

$$\text{similarity\_pixel} = \gamma \cdot \text{SAD}(\text{hist\_edge\_top} - \text{hist\_edge\_bot}) \quad (25)$$

The suitability of the top-to-bottom model may be determined using the two similarity measures similarity_pixel and similarity_edge as shown in equation (26) as follows:

$$\text{suitability\_top\_to\_bottom\_model} = \text{MIN}(\text{AVG}(\text{similarity\_pixel}, \text{similarity\_edge}) + \text{BIAS}, \text{THR}) \quad (26)$$

where BIAS may be a constant added to the average of similarity_pixel and similarity_edge, THR may be the upper hound of suitability_top_to_bottom_model. In sortie examples, a lower bound may be defined as well. In some examples suitability_top_to_bottom_model may be compared to a predetermined threshold to determine whether the top-to-bottom geometric model may be suitable. If the top-to-bottom geometric mode is suitable, the processing as described with respect to FIG. 8 and, in particular modules 805, 820, and 825 may be performed. If the top-to-bottom geometric model is not suitable, those modules may be skipped and processing may proceed directly from module 815 and 810 to merge module 835 such that enhanced depth map 817 may be merged with local enhanced depth map 812 prior to processing at ghosting reduction module 620.

As will be discussed in greater detail below, system 100 may be used so perform some or all of the various functions discussed below in connection with FIG. 9, or the functions previously discussed.

Figure 9:
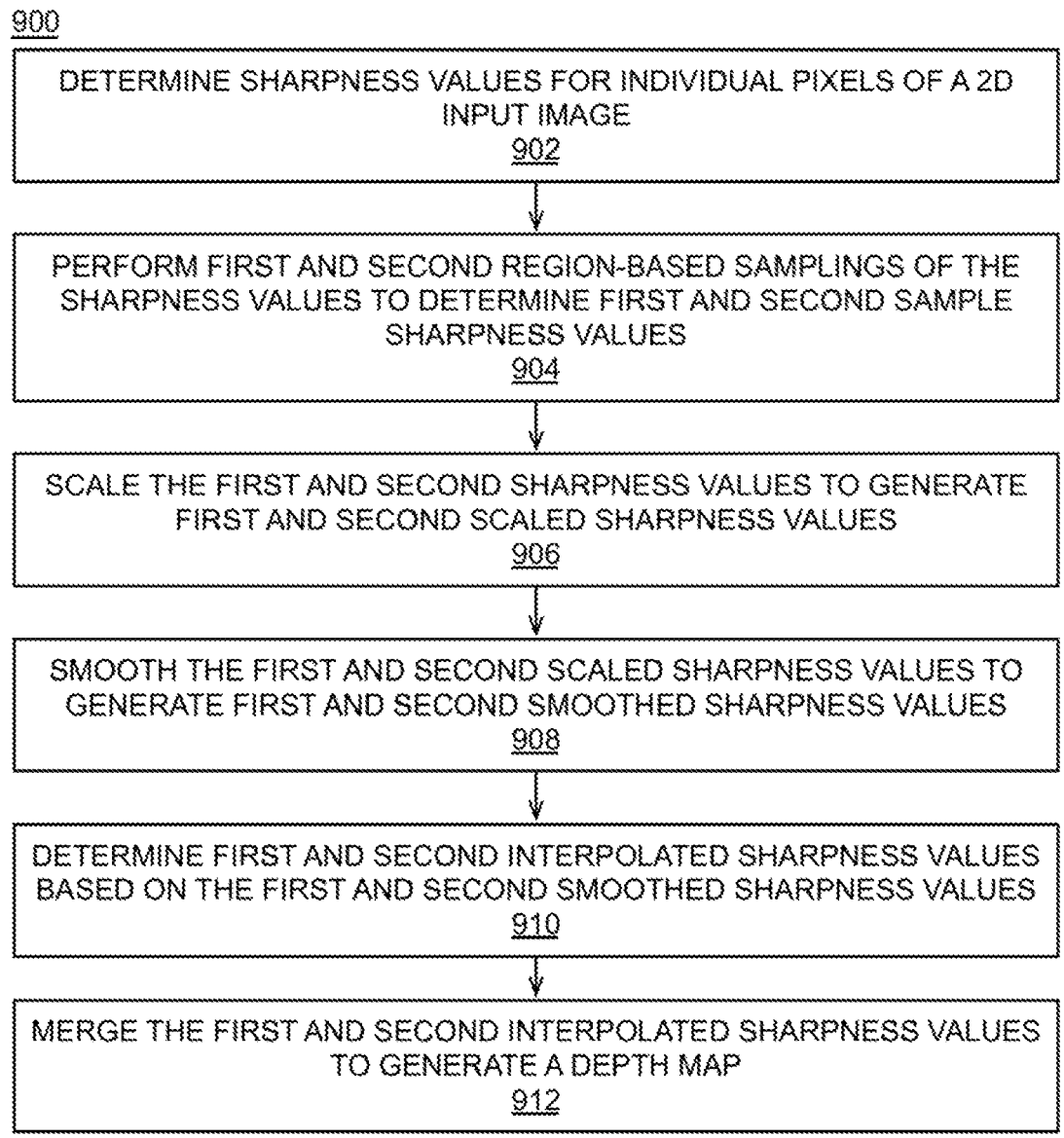
FIG. 9 is a flow chart illustrating an example process for converting a 2-dimensional (2D) image to 3-dimensional (3D) stereo images.

FIG. 9 is a flow chart illustrating an example process 900 for converting a 2-dimensional (2D) image to 3-dimensional (3D) stereo images, arranged in accordance with at least some implementations of the present disclosure, in the illustrated implementation, process 900 may include one or more, operations, functions or actions as illustrated by one or more of blocks 902, 904, 906, 908, 910, and/or 912. By way of non-limiting example, process 900 will be described herein with reference to example system 100.

Process 900 may be utilized as a computer-implemented method for converting a 2-dimensional (2D) image to 3-dimensional (3D) stereo images. Process 900 may begin at block 902, "DETERMINE SHARPNESS VALUES FOR INDIVIDUAL PIXELS OF A 2D INPUT IMAGE", where sharpness values may be determined, for individual pixels of a 2D input image. The 2D input image may include an image file or a video frame or the like. As discussed herein, process 900 may be performed in real-time and automatically such that process 900 may be performed by hardware and/or software and without human intervention.

Processing may continue from operation 902 to operation 904, "PERFORM FIRST AND SECOND REGION-BASED SAMPLINGS OF THE SHARPNESS VALUES TO DETERMINE FIRST AND SECOND SAMPLE SHARPNESS VALUES", where a first region-based sampling of the sharpness values may be performed to determine a first plurality of sample sharpness values and a second region-based sampling of the sharpness values may be performed, to determine a second plurality of sample sharpness values, such that the first and second region-based samplings may be performed at different resolutions, for example. The first and second samplings may be performed at different sampling modules in parallel, for example, or they may be performed at the same sampling module in series. The different resolutions may be provided via sampling at different region sizes or via sampling using different downscaling factors, for example.

Processing may continue from operation 904 to operation 906, "SCALE THE FIRST AND SECOND SHARPNESS VALUES TO GENERATE FIRST AND SECOND SCALED SHARPNESS VALUES", where the first plurality of sharpness values may be scaled to generate a first plurality of scaled sharpness values and the second plurality of sharpness values may be scaled to generate a second plurality of scaled sharpness values, for example. The first, and second scaling operations may be performed at different scaling modules or the same scaling module. One or both of the scaling operations may be performed by implementing a piecewise-linear mapping, for example.

Processing may continue from operation 906 to operation 908, "SMOOTH THE FIRST AND SECOND SCALED SHARPNESS VALUES TO GENERATE FIRST AND SECOND SMOOTHED SHARPNESS VALUES", where the first plurality of scaled sharpness values may be smoothed to generate a first plurality of smoothed sharpness values and the second plurality of scaled sharpness values may be smoothed to generate a second plurality of smoothed sharpness values, for example. The smoothing operations may be performed at different smoothing modules or the same smoothing module. One or both of the smoothing operations may include applying an averaging filter such as, for example, a 3×3 averaging filter.

Processing may continue from operation 90S to operation 910, "DETERMINE FIRST AND SECOND INTERPOLATED SHARPNESS VALUES BASED ON THE FIRST AND SECOND SMOOTHED SHARPNESS VALUES", where a first plurality of interpolated sharpness values may be determined based on the first plurality of smoothed sharpness values and a second plurality of interpolated sharpness values may be determined based on the second plurality of smoothed sharpness values, for example. The interpolations may be performed at different interpolation modules or the same interpolation module. One or both of the interpolations may include a bilinear interpolation, for example. Further, the interpolations may bring the resolution of the interpolated sharpness values to a same resolution as that of the 2D input image.

Processing may continue from operation 910 to operation 912, "MERGE THE FIRST AND SECOND INTERPOLATED SHARPNESS VALUES TO GENERATE A DEPTH MAP", where the first plurality of interpolated sharpness values and the second plurality of interpolated, sharpness values may be merged to generate a depth map having a plurality of depth values associated with the 2D input image, for example. The merge operation may be performed at a merge module. The merge operation may include, in some examples, applying a blending factor when merging the first and second interpolated sharpness values.

As discussed, the generated depth may be optionally enhanced in a variety of ways to generate an enhanced depth map. In any event, the generated depth map or an enhanced depth map associated with the depth map may be used, along with the 2D input image, to generate 3D stereo images (i.e., a left stereo image and right stereo image) for display to a user. The left-view stereo image and right-view stereo image may be generated based on the 2D input image and the depth map by converting the depth map to a disparity value map and determining the left-view stereo image and the right-view stereo image based on the disparity value map and the 2D input image. Further, as discussed, in some examples, two region based samplings may be performed, processed and merged (or blended) to form a depth map. In other examples, more than two regions such as, for example, 3 or 4 or more region based samplings may be performed, processed and merged (or blended) to form a depth map.

In general, the described techniques may generate depth maps using spatial monocular depth cues from a provided 2D input image. The generated depth maps may include, for example, full-resolution maps (i.e., maps having the same resolution as the provided 2D input image). The generated depth maps may include proper depth values for different objects and texture regions within the provided 2D input image, for example. Further, the techniques provided herein may provide automatic real-time 2D to 3D conversion. The techniques may have the advantages of being capable of implementation without advancing device cost and complexity while providing high-quality depth maps.

Some additional and/or alternative details related to process 900 may be implemented as discussed herein. While implementation of example process 900 and processes discussed elsewhere herein may include the undertaking of all blocks shown in the order illustrated, the present disclosure is not limited in this regard and, in various examples, implementation of processes 900 and processes discussed elsewhere herein may include the undertaking only a subset of the blocks shown and/or in a different order than illustrated.

In addition, any one or more of the blocks of FIGS. 1 and 5-9 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 1 and 5-9, and processes discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
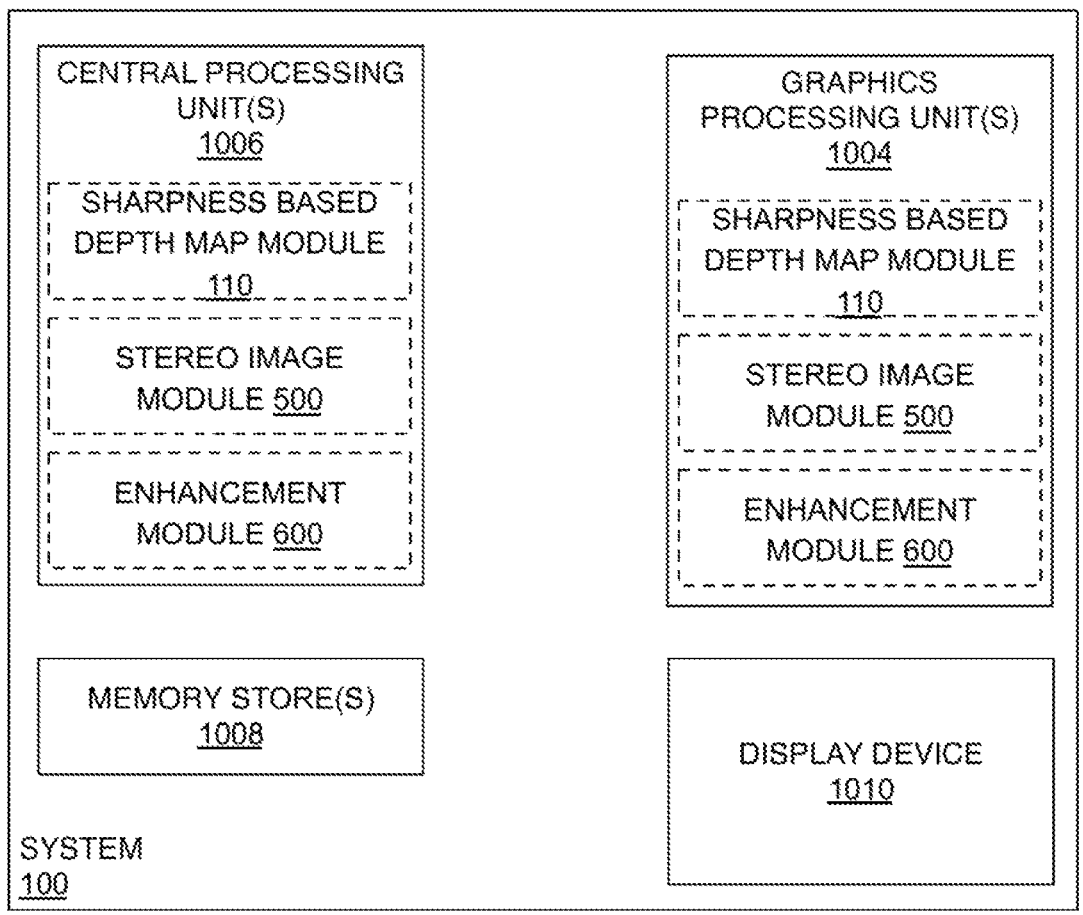
FIG. 10 is an illustrative diagram of an example system for converting a 2-dimensional (2D) image to 3-dimensional (3D) stereo images.

FIG. 10 is an illustrative diagram of an example system 100 for converting a 2-dimensional (2D) image to 3-dimensional (3D) stereo images, arranged in accordance with at least some implementations of the present disclosure. In the illustrated implementation, system 100 may include one or more central processing units 1006, one or more memory stores 1008, one or more graphics processing units 1004, and/or a display device 1110. Central processing units 1006, memory store 1008 and graphics processing units 1004 may be capable of communication with one another, via, for example, a bus or other access. In various implementations, display device 1010 may be integrated in system 100 or implemented separately from system 100.

As shown in FIG. 10, and discussed above, sharpness based depth map module 110 may be implemented via central processing units 1006 or graphics processing units 1004. Similarly, stereo image module 500 may be implemented via central processing units 1006 or graphics processing units 1004. Further, enhancement module 600 may be implemented via central processing units 1006 or graphics processing units 1004. Further still, local enhancement module 810, depth contrast enhancement modules 815, 820, and 830, merge modules 825 and 835, ghosting reduction module 840, and/or temporal filtering module 845 (as discussed with respect to FIG. 8 herein) may be implemented via central processing units 1006 or graphics processing units 1004, although they are not shown in FIG. 10 for the sake of clarity of presentation.

As will be appreciated, the modules illustrated in FIG. 10 may include a variety of software and/or hardware modules and/or modules that may be implemented via software and/or hardware. For example, the modules may be implemented as software via central processing units 1006 and/or graphics processing units 1004 or the modules may be implemented via a dedicated hardware portion or portions of graphics processing units 1004, for example. Further, the shown memory stores 1008 may be shared memory for central processing units 1006 and/or graphics processing units 1004, for example. Also, system 100 may be implemented in a variety of ways. For example, system 100 (excluding display device 1010) may be implemented as a single chip or device having a graphics processor, a quad-core central processing unit, on-board cache, and a memory controller input/output (I/O) module (not shown). In other examples, system 100 (again excluding display device 1010) may be implemented as a chipset.

Central processing units 1006 may include any suitable implementation including, for example, microprocessor(s), multicore processors, application specific integrated circuits, chip(s), chipsets, or the like. Further, graphics processing units 1004 may include any suitable implementation including, for example, processor(s), multicore processors, application specific integrated circuits, programmable logic devices, graphics cards, integrated graphics, general purpose graphics processing unit(s), or the like. In addition, memory stores 1008 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1008 may be implemented by cache memory. In various examples, system 100 may be implemented as a chipset or as a system on a chip.

Figure 11:
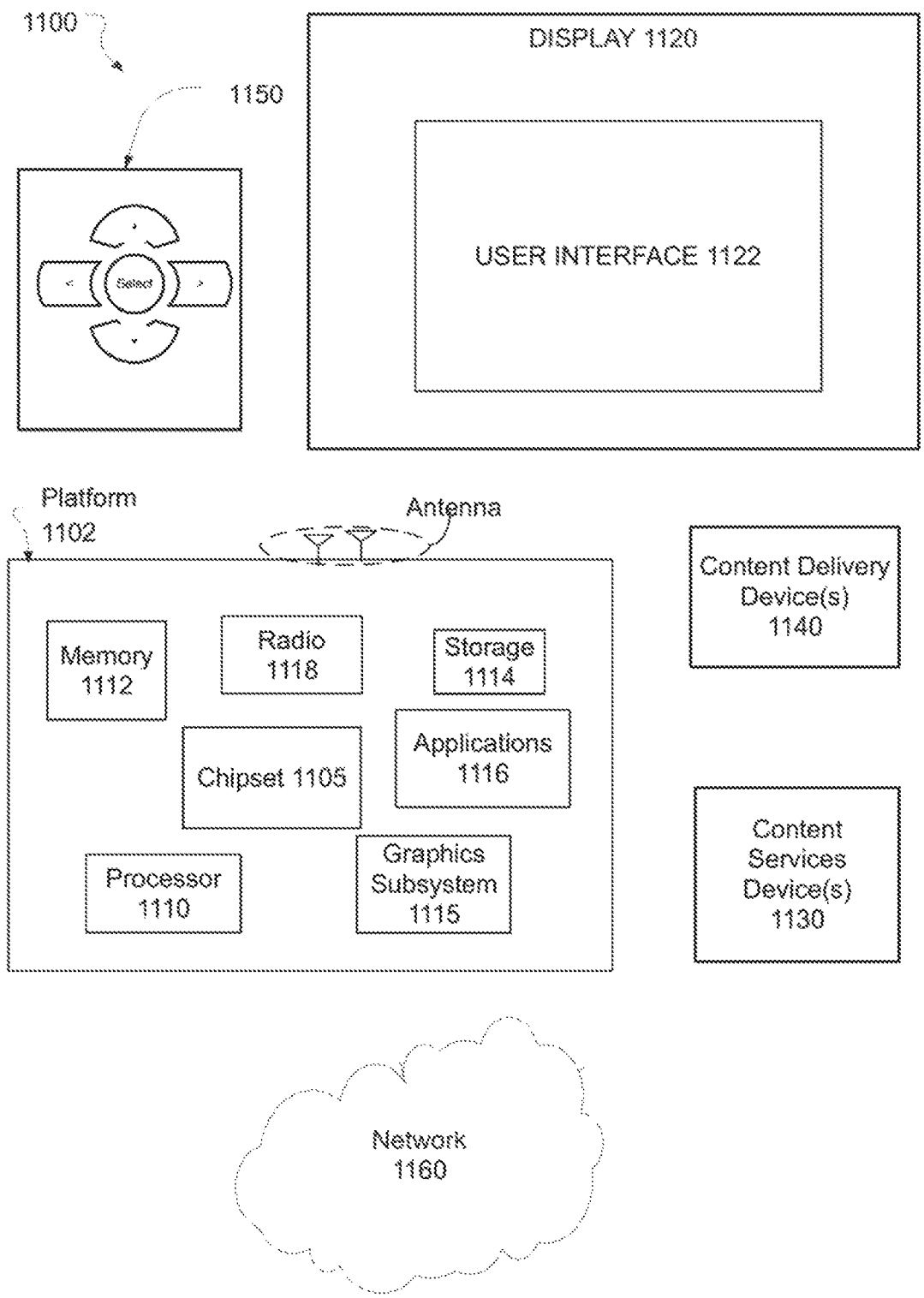
FIG. 11 is an illustrative diagram of an example system.

FIG. 11 illustrates an example system 1100 in accordance with the present disclosure. In various implementations, system 1100 may be a media system although system 1100 is not limited to this context. For example, system 1100 may be incorporated into a personal computer (PC), lnptop computer, ultra-laptop computer, tablet, touch pad, portable computer, handheld computer, palmtop computer, personal digital assistant (FDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114 graphics subsystem 1115 applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core precessor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interlace may be used to communicatively couple graphics subsystem 1115 and display 1120. For example, the interface may be any of a High-Definition Multimedia Interface, Display Port, wireless HDML and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited tot wireless local area networks (WLANs), wireless personal area networks (WPANs), wireless metropolitan area network (WMANs), cellular networks, and satellite Networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data, to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform; is turned "off." In addition, chipset 1105 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with, a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data front a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
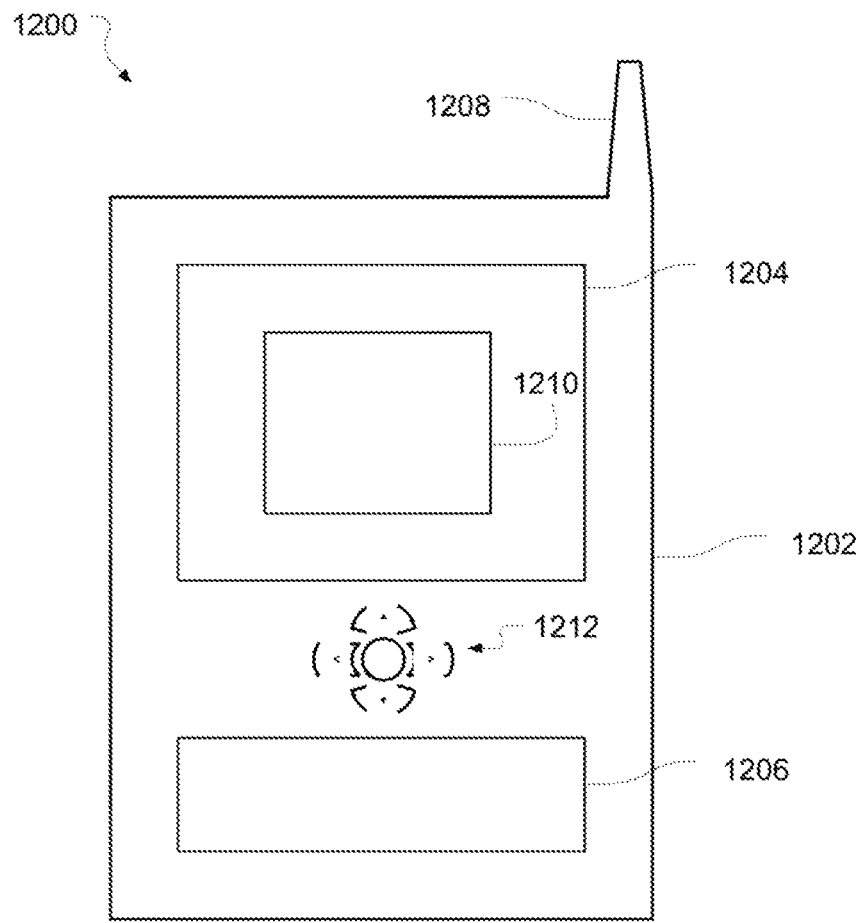
FIG. 12 is an illustrative diagram of an example system, all arranged in accordance with at least some implementations of the present disclosure.

As described above, system 1100 may be embodied in varying physical styles or form factors. FIG. 12 illustrates implementations of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments am not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software Interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which, when, read by a machine causes the machine to fabricate logic to perform the technique described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to further embodiments.

In one example, a computer-implemented method for converting a 2-dimensional (2D) image to 3-dimensional (3D) stereo images may include determining sharpness values for individual pixels of a 2D input image. A first region-based sampling of the sharpness values may be performed to determine a first plurality of sample sharpness values and a second region-based sampling of the sharpness values may be performed to determine a second plurality of sample sharpness values such that the first and second region-based samplings may be performed at different resolutions. The first plurality of sharpness values may be scaled to generate a first plurality of scaled sharpness values and the second plurality of sharpness values may be scaled to generate a second plurality of scaled sharpness values. The first plurality of scaled sharpness values may be smoothed to generate a first plurality of smoothed sharpness values and the second plurality of scaled sharpness values may be smoothed to generate a second plurality of smoothed sharpness values. A first plurality of interpolated sharpness values may be determined based on the first plurality of smoothed sharpness values and a second plurality of interpolated sharpness values may be determined based on the second plurality of smoothed sharpness values. The first plurality of interpolated sharpness values and the second plurality of interpolated sharpness values may be merged to generate a depth map having a plurality of depth values associated with the 2D input image.

In a further example of a computer-implemented method for converting a 2-dimensional (2D) image to 3-dimensional (3D) stereo images, a left-view stereo image and a right-view stereo image may be generated based on the 2D input image and the depth map such mat generating the left-view stereo image and the right-view stereo image may include converting the depth map to a disparity value map and determining the left-view stereo image and the right-view stereo image based on the disparity value map. An enhancement of depth contrast may be performed on the depth map to generate an enhanced depth map. Performing the enhancement of depth contrast may include at least one of performing only a vertical enhancement on the depth map to generate the enhanced depth map, performing, in parallel, a vertical enhancement, a left-to-right horizontal enhancement, and a right-to-left horizontal enhancement on the depth map, and combining the vertical enhancement, the left-to-right horizontal enhancement and the right-to-left horizontal enhancement to generate the enhanced depth map, or first performing a vertical enhancement and subsequently performing a left-to-right horizontal enhancement and a right-to-left horizontal enhancement to generate the enhanced depth map. Performing the vertical enhancement on the depth map may include comparing a pixel value of a first pixel at a first row and a first column of the depth map to a pixel value of a second pixel at a second row and the first column of the depth map such that the first row is above the second row, determining whether a difference between the pixel value of the first pixel and the pixel value of the second pixel is within a threshold, and, if the difference is within the threshold, setting the pixel value of the first pixel and the pixel value of the second pixel to the smaller of the first pixel and the pixel value of the second pixel, or, if the difference is not within the threshold, making no changes to the pixel value of the first, pixel and the pixel value of the second pixel. A ghosting reduction on the enhanced depth map may be performed to generate a ghosting reduced enhanced depth map. Performing the ghost reduction may include at least one of shifting the entire enhanced depth map by a depth offset to shift either away from or toward a zero-parallax screen or modifying brightness values of the enhanced depth map to reduce sharpness and/or contrast at edges within the enhanced depth map. A temporal filtering on the ghosting reduced enhanced depth map and a second ghosting reduced enhanced depth map temporally preceding the ghosting reduced enhanced depth map by a time, t, may be performed to generate a temporally filtered ghosting reduced enhanced depth map. Performing the temporal filtering may include modifying depth values of the ghosting reduced enhanced depth map based on a weighting factor such that the weighting factor may be based on an absolute value difference between a depth value in the ghosting reduced enhanced depth map and a depth value in the second ghosting reduced enhanced depth map. A second left-view stereo image and a second right-view stereo image may be generated based on the 2D input image and the temporally filtered ghosting reduced enhanced depth map. Generating the second left-view stereo image and the second right-view stereo image may include converting the temporally filtered ghosting reduced enhanced depth map to a second disparity value map and determining the left-view stereo image and the right-view stereo image based on the second disparity value map. Determining the sharpness values for the individual pixels of the input image may include determining the sharpness values based on pixel values of the individual pixels such that the pixel values may include at least one of luma Y values of the individual pixels or R/G/B values of the individual pixels and such that determining the sharpness values may include determining a sharpness value for every pixel of the input image. Determining a first sharpness value for a first individual pixel may include determining, for the first individual pixel of the individual pixels, a vertical sharpness of the first individual pixel as an absolute value difference between an absolute value difference of a pixel value of a pixel above the first individual pixel and a pixel value of the first individual pixel and an absolute value difference of a pixel value of a pixel below the first individual pixel and the pixel value of the first individual pixel, determining, for the first individual pixel, a horizontal sharpness of the first individual pixel as an absolute value difference between an absolute value difference of a pixel value of a pixel left of the first individual pixel and the pixel value of the first individual pixel and an absolute value difference of a pixel value of a pixel right of the first individual pixel and the pixel valise of the first individual pixel, and determining the first sharpness value as at least one of a maximum of the vertical sharpness and the horizontal sharpness or an average of the vertical sharpness and the horizontal sharpness. Performing the first region-based sampling and the second region-based sampling may include at least one of performing samplings at different region sizes or performing samplings at the same region sizes but different downscaling of the sharpness values. Smoothing the first plurality of scaled sharpness values may include applying a 3×3 averaging filter. Determining the first plurality of interpolated sharpness values may include perforating a bilinear interpolation, and the first plurality of interpolated sharpness values and the second plurality of interpolated sharpness values may each include a sharpness value associated with every pixel of the 2D input image. Merging the first plurality of interpolated sharpness values and the second plurality of interpolated sharpness values may include applying a blending factor. The 2D input image may include at least one of an image file or a video frame. The depth map may be generated in real time.

In an alternative further example of a computer-implemented method for converting a 2-dimensional (2D) image to 3-dimensional (3D) stereo images, a top-to-bottom depth map associated with the 2D input image may be determined such that the top-to-bottom depth map may include a plurality depth values constant across respective rows of the top-to-bottom depth map increasing from a top of the top-to-bottom depth map to a bottom of the top-to-bottom depth map. One or more edges may be determined in the 2D input image. Determining the one or more edges may include at least one of comparing pixel value differences between row pairs of pixels of the 2D input image to a threshold or applying Sobel operators. Determining the one or more edges may provide one or more blending factor associated with the one or mote edges. The top-to-bottom depth map may be modified by the one or more blending factors to generate a geometric model based depth surface. A vertical enhancement of depth contrast may be performed on the geometric model based depth surface to generate an enhanced geometric model based depth surface. A second vertical enhancement of depth contrast may be performed on the depth map to generate an enhanced depth map. The enhanced depth map and the enhanced geometric model based depth surface may be merged to generate a merged depth map. A horizontal enhancement of depth contrast may be performed on the merged depth map to generate a horizontal enhanced depth map. Edge-based and luma-based local enhancement may be performed on the 2D input image to generate an enhanced 2D image. The enhanced 2D image and the horizontal enhanced depth map may be merged to generate a second merged depth map. A ghosting reduction may be performed on the second merged depth map to generate a ghosting reduced depth map. A temporal filtering may be performed on the ghosting reduced depth map and a second ghosting reduced enhanced depth map temporally preceding the ghosting reduced depth map by a time, t, to generate a temporally filtered ghosting reduced depth map. A left-view stereo image and a right-view stereo image may be generated based on the 2D input image and the temporally filtered ghosting reduced depth map. Generating the left-view stereo image and the right-view stereo image may include converting the temporally filtered ghosting reduced depth map to a disparity value map and determining the left-view stereo image and the right-view stereo image based on the second disparity value map.

In another example, a system for converting a 2-dimensional (2D) image to 3-dimensional (3D) stereo image on a device may include a display device, one or more processors, one or more memory stores, a sharpness measurement, module, at least one sampling module, at least one scaling module, at least one smoothing module, at least one interpolation module, and a merge module. The one or more processors may be communicatively coupled to the display device. The one or more memory stores may be communicatively coupled to the one or more processors. The sharpness measurement module may be configured to determine sharpness values for individual pixels of a 2D input image. The at least one sampling module may be configured to perform a first region-based sampling of the sharpness values to determine a first plurality of sample sharpness values and a second region-based sampling of the sharpness values to determine a second plurality of sample sharpness values such that the first and second region-based samplings are performed at different resolutions. The at least one scaling module may be configured to scale the first, plurality of sharpness values to generate a first plurality of scaled sharpness values and the second plurality of sharpness values to generate a second plurality of scaled sharpness values. The at least one smoothing module may be configured to smooth the first plurality of scaled sharpness values to generate a first plurality of smoothed sharpness values and the second plurality of scaled sharpness values to generate a second plurality of smoothed sharpness values. The at least one interpolation module may be configured to determine a first plurality of interpolated sharpness values based on the first plurality of smoothed sharpness values and a second plurality of interpolated sharpness values based on the second plurality of smoothed sharpness values. The merge module may be configured to merging the first plurality of interpolated sharpness values and the second plurality of interpolated sharpness values to generate a depth map having a plurality of depth values associated with the 2D input image.

In a further example of a system for converting a 2-dimensional (2D) image to 3-dimensional (3D) stereo image on a device, the system may include a stereo image module, a depth contrast enhancement module, a ghosting reduction module, a temporal filtering module, and a graphics processing unit. The stereo image module may be configured to generate a left-view stereo image and a right-view stereo image based on the 2D input image and the depth map such that generating the left-view stereo image and the right-view stereo image may include converting the depth map to a disparity value map and determining the left-view stereo image and the right-view stereo image based on the disparity value map. The depth contrast enhancement module may be configured to perform an enhancement of depth contrast on the depth map to generate an enhanced depth map. The depth contrast enhancement module may be configured to perform the enhancement of depth contrast on the depth map by at least one of performing only a vertical enhancement on the depth map to generate the enhanced depth map, performing, in parallel, a vertical enhancement, a left-to-right horizontal enhancement, and a right-to-left horizontal enhancement on the depth map, and combining the vertical enhancement, the left-to-right horizontal enhancement, and the right-to-left horizontal enhancement to generate the enhanced depth map, or first performing a vertical enhancement and subsequently performing a left-to-right horizontal enhancement and a right-to-left horizontal enhancement to generate the enhanced depth map. Performing the vertical enhancement on the depth map may include comparing a pixel value of a first pixel at a first row and a first column of the depth map to a pixel value of a second pixel at a second row and the first column of the depth map, wherein the first row is above the second row, determining whether a difference between the pixel value of the first pixel and the pixel value of the second pixel is within a threshold, and, if the difference is within the threshold, setting the pixel value of the first pixel and the pixel value of the second pixel to the smaller of the first pixel and the pixel value of the second pixel or, if the difference is not within the threshold, making no changes so the pixel value of the first pixel and the pixel value of the second pixel. The ghosting reduction module may be configured to perform a ghosting reduction on the enhanced depth map to generate a ghosting reduced enhanced depth map. The ghosting reduction module configured to perform the ghosting reduction by at least one of shifting the entire enhanced depth map by a depth offset to shift either away from or toward a zero-parallax screen or modifying brightness values of the enhanced depth map to reduce sharpness and/or contrast at edges within the enhanced depth map. The temporal filtering module may be configured to perform a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map. The temporal filtering module may be configured to perform the temporal filtering by modifying depth values of the ghosting reduced enhanced depth map based on a weighting factor, wherein the weighting factor is based on an absolute value difference between a depth value in the ghosting reduced enhanced depth map and a depth value in the second ghosting reduced enhanced depth map. The stereo image module may be further configured to generate a second left-view stereo image and a second right-view stereo image based on the 2D input image and the temporally filtered ghosting reduced enhanced depth map. The stereo image module may be further configured to generate the second left-view stereo image and the second right-view stereo image by converting the temporally filtered ghosting reduced enhanced depth map to a disparity value map and determining the left-view stereo image and the right-view stereo image based on the disparity value map. The sharpness measurement module may configured to determine the sharpness values for the individual pixels of the input image by determining the sharpness values based on pixel values of the individual pixels, wherein the pixel values comprise at least one of luma Y values of the individual pixels or R/G/B values of the individual pixels. Determining a first sharpness value for a first individual pixel may include determining, for the first individual pixel of the individual pixels, a vertical sharpness of the first individual pixel as an absolute value difference between an absolute value difference of a pixel value of a pixel above the first individual pixel and a pixel value of the first individual pixel and an absolute value difference of a pixel value of a pixel below the first individual pixel and the pixel value of the first individual pixel, determining, for the first individual pixel, a horizontal sharpness of the first individual pixel as an absolute value difference between an absolute value difference of a pixel value of a pixel left of the first individual pixel and the pixel value of the first individual pixel and an absolute value difference of a pixel value of a pixel right of the first individual pixel and the pixel value of the first individual pixel, and determining the first sharpness value as at least one of a maximum of the vertical sharpness and the horizontal sharpness or an average of the vertical sharpness and the horizontal sharpness. The at least one sampling module may be configured to perform the first region-based sampling and the second region-based sampling by at least one of performing samplings at different region sizes or performing samplings at the same region sizes but different downscaling of the sharpness values. The at least one scaling module may be configured to scale the first plurality of sharpness values by scaling the first plurality of sharpness values based on a piecewise-linear snapping. The at least one smoothing module may be configured to smooth the first plurality of scaled sharpness values by applying a 3×3 averaging filter. The at least one interpolation module may be configured to determine the first plurality of interpolated sharpness values by performing a bilinear interpolation. The first plurality of interpolated sharpness values and the second plurality of interpolated sharpness values may each include a sharpness value associated with, every pixel of the 2D input image. The merge module may be configured to merge the first plurality of interpolated sharpness values and the second plurality of interpolated sharpness values by applying a blending factor. The 2D input image may include at least one of an image file or a video frame. The at least one sampling module may include a first sampling module configured to perform the first region-based sampling and a second sampling module configured to perform the second region-based sampling. The at least one scaling module may include a first scaling module configured to scale the first plurality of sharpness values and a second scaling module configured to scale the second plurality of sharpness values. The at least one smoothing module may include a first smoothing module configured to smooth the first plurality of scaled sharpness values and a second smoothing module configured to smooth the second plurality of scaled sharpness values. The at least one interpolation module may include a first interpolation module configured to determine the first plurality of interpolated sharpness values and a second interpolation module configured to determine the second plurality of interpolated sharpness values. The sharpness measurement module, the at least one sampling module, the at least one scaling module, the at least one smoothing module, the at least one interpolation module, and the merge module may be implemented via at least one of the one or more processors or the graphics processing unit.

In an alternative further example of a system for converting a 2-dimensional (2D) image to 3-dimensional (3D) stereo image on a device, the system may include a geometric model based depth surface module, a first, depth contrast enhancement module, a second depth contrast enhancement module, a first merge module, a third depth contrast enhancement module, a local enhancement module, a second merge module, a ghosting reduction module, a temporal filtering module, and a stereo image module. The geometric model based depth surface module may be configured to determine a top-to-bottom depth map associated with the 2D input image such that the top-to-bottom depth map includes a plurality depth values constant across respective rows of the top-to-bottom depth map increasing from a top of the top-to-bottom depth map to a bottom of the top-to-bottom depth map, determine one or more edges in the 2D input image such that determining the one or more edges includes at least one of comparing pixel value differences between row pairs of pixels of the 2D input image to a threshold or applying Sobel operators and such mat determining the one or more edges provides one or more blending factor associated with the one or more edges, and modify the top-to-bottom depth map by the one or more blending factors to generate a geometric model based depth surface. The first depth contrast enhancement module may be configured to perforin a vertical enhancement of depth contrast on the geometric model based depth surface to generate an enhanced geometric model based depth surface. The second depth contrast enhancement module may be configured to perform a second vertical enhancement of depth contrast on the depth map to generate an enhanced depth map. The first merge module may be configured to merge the enhanced depth map and the enhanced geometric model based depth surface to generate a merged depth map. The third depth contrast enhancement module my be configured to perform a horizontal enhancement of depth contrast on the merged depth map to generate a horizontal enhanced depth map. The local enhancement module may be configured to perform edge-based and luma-based local enhancement on the 2D input image to generate an enhanced 2D image. The second merge module may be configured to merge the enhanced 2D image and the horizontal enhanced depth map to generate a second merged depth map. The ghosting reduction module may be configured to perform a ghosting reduction on the second merged depth map to generate a ghosting reduced depth map. The temporal filtering module may be configured to perform a temporal filtering on the ghosting reduced depth map and a second ghosting reduced enhanced depth map temporally preceding the ghosting reduced depth map by a tune, t, to generate a temporally filtered ghosting reduced depth map. The stereo image module may be configured to generate a left-view stereo image and a right-view stereo image based on the 2D input image and the temporally filtered ghosting reduced depth map Generating the left-view stereo image and foe right-view stereo image may include converting the temporally filtered ghosting reduced depth map to a disparity value map and determining the left-view stereo image and the right-view stereo image based on the second disparity value map In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for converting a 2-dimensional (2D) image to 3-dimensional (3D) stereo images comprising:
   determining sharpness values for individual pixels of a 2D input image;
   performing a first region-based sampling of the sharpness values to determine a first plurality of sample sharpness values and a second region-based sampling of the sharpness values to determine a second plurality of sample sharpness values, wherein the first and second region-based samplings are performed at different resolutions;
   scaling the first plurality of sharpness values to generate a first plurality of scaled sharpness values and the second plurality of sharpness values to generate a second plurality of scaled sharpness values;
   smoothing the first plurality of scaled sharpness values to generate a first plurality of smoothed sharpness values and the second plurality of scaled sharpness values to generate a second plurality of smoothed sharpness values;
   determining a first plurality of interpolated sharpness values based on the first plurality of smoothed sharpness values and a second plurality of interpolated sharpness values based on the second plurality of smoothed sharpness values; and
   merging the first plurality of interpolated sharpness values and the second plurality of interpolated sharpness values to generate a depth map having a plurality of depth values associated with the 2D input image.

2. The method of claim 1, further comprising:
   generating a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map.

3. The method of claim 1, further comprising:
   performing an enhancement of depth contrast on the depth map to generate an enhanced depth map;
   performing a ghosting reduction on the enhanced depth map to generate a ghosting reduced enhanced depth map;
   performing a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map; and
   generating a left-view stereo image and a right-view stereo image based on the 2D input image and the temporally filtered ghosting reduced enhanced depth map, wherein generating the left-view stereo image and the right-view stereo image comprises converting the temporally filtered ghosting reduced enhanced depth map to a disparity value map and determining the left-view stereo image and the right-view stereo image based on the second disparity value map.

4. The method of claim 1, further comprising:
   performing an enhancement of depth contrast on the depth map to generate an enhanced depth map; and
   generating a left-view stereo image and a right-view stereo image based on the 2D input image and the enhanced depth map, wherein generating the left-view stereo image and the right-view stereo image comprises converting the enhanced depth map to a disparity value map and determining the left-view stereo image and the right-view stereo image based on the disparity value map.

5. The method of claim 1, further comprising:
   performing an enhancement of depth contrast on the depth map to generate an enhanced depth map;
   performing a ghosting reduction on the enhanced depth map to generate a ghosting reduced enhanced depth map; and
   generating a left-view stereo image and a right-view stereo image based on the 2D input image and the ghosting reduced enhanced depth map, wherein generating the left-view stereo image and the right-view stereo image comprises converting the ghosting reduced enhanced depth map to a disparity value map and determining the left-view stereo image and the right-view stereo image based on the disparity value map.

6. The method of claim 1, wherein performing the first region-based sampling and the second region-based sampling comprises at least one of performing samplings at different region sizes or performing samplings at the same region sizes but different downscaling of the sharpness values.

7. The method of claim 1, wherein scaling the first plurality of sharpness values comprises scaling the first plurality of sharpness values based on a piecewise-linear mapping.

8. The method of claim 1, wherein determining the first plurality of interpolated sharpness values comprises performing a bilinear interpolation, and wherein the first plurality of interpolated sharpness values and the second plurality of interpolated sharpness values each comprise a sharpness value associated with every pixel of the 2D input image.

9. The method of claim 1, further comprising:
   generating a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map;
   performing an enhancement of depth contrast on the depth map to generate an enhanced depth map, wherein performing the enhancement of depth contrast comprises at least one of:
      performing only a vertical enhancement on the depth map to generate the enhanced depth map,
      performing, in parallel, a vertical enhancement, a left-to-right horizontal enhancement, and a right-to-left horizontal enhancement on the depth map, and combining the vertical enhancement, the left-to-right horizontal enhancement and the right-to-left horizontal enhancement to generate the enhanced depth map, or
      first performing a vertical enhancement and subsequently performing a left-to-right horizontal enhancement and a right-to-left horizontal enhancement to generate the enhanced depth map,
   wherein performing the vertical enhancement on the depth map comprises:
      comparing a pixel value of a first pixel at a first row and a first column of the depth map to a pixel value of a second pixel at a second row and the first column of the depth map, wherein the first row is above the second row;

determining whether a difference between the pixel value of the first pixel and the pixel value of the second pixel is within a threshold; and
if the difference is within the threshold, setting the pixel value of the first pixel and the pixel value of the second pixel to the smaller of the first pixel and the pixel value of the second pixel; and
if the difference is not within the threshold, making no changes to the pixel value of the first pixel and the pixel value of the second pixel;
performing a ghosting reduction on the enhanced depth map to generate a ghosting reduced enhanced depth map, wherein performing the ghost reduction comprises at least one of:
shifting the entire enhanced depth map by a depth offset to shift either away from or toward a zero-parallax screen, or
modifying brightness values of the enhanced depth map to reduce sharpness and/or contrast at edges within the enhanced depth map;
performing a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map, wherein performing the temporal filtering comprises:
modifying depth values of the ghosting reduced enhanced depth map based on a weighting factor, wherein the weighting factor is based on an absolute value difference between a depth value in the ghosting reduced enhanced depth map and a depth value in the second ghosting reduced enhanced depth map; and
generating a second left-view stereo image and a second right-view stereo image based on the 2D input image and the temporally filtered ghosting reduced enhanced depth map, wherein generating the second left-view stereo image and the second right-view stereo image comprises converting the temporally filtered ghosting reduced enhanced depth map to a second disparity value map and determining the left-view stereo image and the right-view stereo image based on the second disparity value map,
wherein determining the sharpness values for the individual pixels of the input image comprises determining the sharpness values based on pixel values of the individual pixels, wherein the pixel values comprise at least one of luma Y values of the individual pixels or R/G/B values of the individual pixels, wherein determining the sharpness values comprises determining a sharpness value for every pixel of the input image, and wherein determining a first sharpness value for a first individual pixel comprises:
determining, for the first individual pixel of the individual pixels, a vertical sharpness of the first individual pixel as an absolute value difference between an absolute value difference of a pixel value of a pixel above the first individual pixel and a pixel value of the first individual pixel and an absolute value difference of a pixel value of a pixel below the first individual pixel and the pixel value of the first individual pixel;
determining, for the first individual pixel, a horizontal sharpness of the first individual pixel as an absolute value difference between an absolute value difference of a pixel value of a pixel left of the first individual pixel and the pixel value of the first individual pixel and an absolute value difference of a pixel value of a pixel right of the first individual pixel and the pixel value of the first individual pixel; and
determining the first sharpness value as at least one of a maximum of the vertical sharpness and the horizontal sharpness or an average of the vertical sharpness and the horizontal sharpness,
wherein performing the first region-based sampling and the second region-based sampling comprises at least one of performing samplings at different region sizes or performing samplings at the same region sizes but different downscaling of the sharpness values,
wherein scaling the first plurality of sharpness values comprises scaling the first plurality of sharpness values based on a piecewise-linear mapping,
wherein smoothing the first plurality of scaled sharpness values comprises applying a 3×3 averaging filter,
wherein determining the first plurality of interpolated sharpness values comprises performing a bilinear interpolation, and wherein the first plurality of interpolated sharpness values and the second plurality of interpolated sharpness values each comprise a sharpness value associated with every pixel of the 2D input image,
wherein merging the first plurality of interpolated sharpness values and the second plurality of interpolated sharpness values comprises applying a blending factor,
wherein the 2D input image comprises at least one of an image file or a video frame, and
wherein the depth map is generated in real time.

10. The method of claim 1, further comprising:
determining a top-to-bottom depth map associated with the 2D input image, wherein the top-to-bottom depth map comprise a plurality depth values constant across respective rows of the top-to-bottom depth map increasing from a top of the top-to-bottom depth map to a bottom of the top-to-bottom depth map;
determining one or more edges in the 2D input image, wherein determining the one or more edges comprises at least one of comparing pixel value differences between row pairs of pixels of the 2D input image to a threshold or applying Sobel operators, and wherein determining the one or more edges provides one or more blending factor associated with the one or more edges;
modifying the top-to-bottom depth map by the one or more blending factors to generate a geometric model based depth surface;
performing a vertical enhancement of depth contrast on the geometric model based depth surface to generate an enhanced geometric model based depth surface;
performing a second vertical enhancement of depth contrast on the depth map to generate an enhanced depth map;
merging the enhanced depth map and the enhanced geometric model based depth surface to generate a merged depth map;
performing a horizontal enhancement of depth contrast on the merged depth map to generate a horizontal enhanced depth map;
performing edge-based and luma-based local enhancement on the 2D input image to generate an enhanced 2D image;
merging the enhanced 2D image and the horizontal enhanced depth map to generate a second merged depth map;
performing a ghosting reduction on the second merged depth map to generate a ghosting reduced depth map;
performing a temporal filtering on the ghosting reduced depth map and a second ghosting reduced enhanced depth map temporally preceding the ghosting reduced depth map by a time, t, to generate a temporally filtered ghosting reduced depth map; and generating a left-view stereo image and a right-view stereo image based on the 2D input image and the temporally filtered ghosting reduced depth map, wherein generating the left-view stereo image and the right-view stereo image comprises converting the temporally filtered ghosting reduced depth map to a disparity value map and determining the left-view stereo image and the right-view stereo image based on the second disparity value map.

11. A system for converting a 2-dimensional (2D) image to 3-dimensional (3D) stereo image on a device, comprising:
a display device configured to present image data;
one or more processors communicatively coupled to the display device;
one or more memory stores communicatively coupled to the one or more processors;
a sharpness measurement module configured to determine sharpness values for individual pixels of a 2D input image;
at least one sampling module configured to perform a first region-based sampling of the sharpness values to determine a first plurality of sample sharpness values and a second region-based sampling of the sharpness values to determine a second plurality of sample sharpness values, wherein the first and second region-based samplings are performed at different resolutions;
at least one scaling module configured to scale the first plurality of sharpness values to generate a first plurality of scaled sharpness values and the second plurality of sharpness values to generate a second plurality of scaled sharpness values;
at least one smoothing module configured to smooth the first plurality of scaled sharpness values to generate a first plurality of smoothed sharpness values and the second plurality of scaled sharpness values to generate a second plurality of smoothed sharpness values;
at least one interpolation module configured to determine a first plurality of interpolated sharpness values based on the first plurality of smoothed sharpness values and a second plurality of interpolated sharpness values based on the second plurality of smoothed sharpness values; and
a merge module configured to merging the first plurality of interpolated sharpness values and the second plurality of interpolated sharpness values to generate a depth map having a plurality of depth values associated with the 2D input image.

12. The system of claim 11, further comprising:
a stereo image module configured to generate a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map.

13. The system of claim 11, further comprising:
a depth contrast enhancement module configured to perform an enhancement of depth contrast on the depth map to generate an enhanced depth map;
a ghosting reduction module configured to perform a ghosting reduction on the enhanced depth map to generate a ghosting reduced enhanced depth map;
a temporal filtering module configured to perform a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map;
a stereo image module configured to generate a left-view stereo image and a right-view stereo image based on the 2D input image and the temporally filtered ghosting reduced enhanced depth map, wherein generating the left-view stereo image and the right-view stereo image comprises converting the temporally filtered ghosting reduced enhanced depth map to a disparity value map and determining the left-view stereo image and the right-view stereo image based on the disparity value map.

14. The system of claim 11, wherein the at least one sampling module is configured to perform the first region-based sampling and the second region-based sampling by at least one of performing samplings at different region sizes or performing samplings at the same region sizes but different downscaling of the sharpness values.

15. The system of claim 11, wherein the at least one scaling module is configured to scale the first plurality of sharpness values by scaling the first plurality of sharpness values based on a piecewise-linear mapping.

16. The system of claim 11, wherein the at least one interpolation module is configured to determine the first plurality of interpolated sharpness values by performing a bilinear interpolation, and wherein the first plurality of interpolated sharpness values and the second plurality of interpolated sharpness values each comprise a sharpness value associated with every pixel of the 2D input image.

17. The system of claim 11, wherein the merge module is configured to merge the first plurality of interpolated sharpness values and the second plurality of interpolated sharpness values by applying a blending factor.

18. The system of claim 11, wherein the at least one sampling module comprises a first sampling module configured to perform the first region-based sampling and a second sampling module configured to perform the second region-based sampling, wherein the at least one scaling module comprises a first scaling module configured to scale the first plurality of sharpness values and a second scaling module configured to scale the second plurality of sharpness values, wherein the at least one smoothing module comprises a first smoothing module configured to smooth the first plurality of scaled sharpness values and a second smoothing module configured to smooth the second plurality of scaled sharpness values, and wherein the at least one interpolation module comprises a first interpolation module configured to determine the first plurality of interpolated sharpness values and a second interpolation module configured to determine the second plurality of interpolated sharpness values.

19. The system of claim 11, further comprising:
a stereo image module configured to generate a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map;
a depth contrast enhancement module configured to perform an enhancement of depth contrast on the depth map to generate an enhanced depth map wherein the depth contrast enhancement module is configured to perform the enhancement of depth contrast on the depth map by at least one of performing only a vertical enhancement on the depth map to generate the enhanced depth map, performing, in parallel, a vertical enhancement, a left-to-right horizontal enhancement, and a right-to-left horizontal enhancement on the depth map, and combining the vertical enhancement, the left-to-right horizontal enhancement and the right-to-left horizontal enhancement to generate the enhanced depth map, or first performing a vertical enhancement and subsequently performing a left-to-right horizontal enhancement and a right-to-left horizontal enhancement to generate the enhanced depth map, wherein performing the vertical enhancement on the depth map comprises:

comparing a pixel value of a first pixel at a first row and a first column of the depth map to a pixel value of a second pixel at a second row and the first column of the depth map, wherein the first row is above the second row;

determining whether a difference between the pixel value of the first pixel and the pixel value of the second pixel is within a threshold; and if the difference is within the threshold, setting the pixel value of the first pixel and the pixel value of the second pixel to the smaller of the first pixel and the pixel value of the second pixel; and if the difference is not within the threshold, making no changes to;

a ghosting reduction module configured to perform a ghosting reduction on the enhanced depth map to generate a ghosting reduced enhanced depth map, wherein the ghosting reduction module configured to perform the ghosting reduction by at least one of:

shifting the entire enhanced depth map by a depth offset to shift either away from or toward a zero-parallax screen, or modifying brightness values of the enhanced depth map to reduce sharpness and/or contrast at edges within the enhanced depth map;

a temporal filtering module configured to perform a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map, wherein the temporal filtering module is configured to perform the temporal filtering by:

modifying depth values of the ghosting reduced enhanced depth map based on a weighting factor, wherein the weighting factor is based on an absolute value difference between a depth value in the ghosting reduced enhanced depth map and a depth value in the second ghosting reduced enhanced depth map; and a graphics processing unit;

wherein the stereo image module is further configured to generate a second left-view stereo image and a second right-view stereo image based on the 2D input image and the temporally filtered ghosting reduced enhanced depth map, wherein the stereo image module is further configured to generate the second left-view stereo image and the second right-view stereo image by converting the temporally filtered ghosting reduced enhanced depth map to a disparity value map and determining the left-view stereo image and the right-view stereo image based on the disparity value map, wherein the sharpness measurement module is configured to determine the sharpness values for the individual pixels of the input image by determining the sharpness values based on pixel values of the individual pixels, wherein the pixel values comprise at least one of luma Y values of the individual pixels or R/G/B values of the individual pixels, wherein determining the sharpness values comprises determining a sharpness value for every pixel of the input image, and wherein determining a first sharpness value for a first individual pixel comprises:

determining, for the first individual pixel of the individual pixels, a vertical sharpness of the first individual pixel as an absolute value difference between an absolute value difference of a pixel value of a pixel above the first individual pixel and a pixel value of the first individual pixel and an absolute value difference of a pixel value of a pixel below the first individual pixel and the pixel value of the first individual pixel;

determining, for the first individual pixel, a horizontal sharpness of the first individual pixel as an absolute value difference between an absolute value difference of a pixel value of a pixel left of the first individual pixel and the pixel value of the first individual pixel and an absolute value difference of a pixel value of a pixel right of the first individual pixel and the pixel value of the first individual pixel; and determining the first sharpness value as at least one of a maximum of the vertical sharpness and the horizontal sharpness or an average of the vertical sharpness and the horizontal sharpness, wherein the at least one sampling module is configured to perform the first region-based sampling and the second region-based sampling by at least one of performing samplings at different region sizes or performing samplings at the same region sizes but different downscaling of the sharpness values, wherein the at least one scaling module is configured to scale the first plurality of sharpness values by scaling the first plurality of sharpness values based on a piecewise-linear mapping, wherein the at least one smoothing module is configured to smooth the first plurality of scaled sharpness values by applying a 3×3 averaging filter, wherein the at least one interpolation module is configured to determine the first plurality of interpolated sharpness values by performing a bilinear interpolation, and wherein the first plurality of interpolated sharpness values and the second plurality of interpolated sharpness values each comprise a sharpness value associated with every pixel of the 2D input image, wherein the merge module is configured to merge the first plurality of interpolated sharpness values and the second plurality of interpolated sharpness values by applying a blending factor, wherein the 2D input image comprises at least one of an image file or a video frame, and wherein the depth map is generated in real time, wherein the at least one sampling module comprises a first sampling module configured to perform the first region-based sampling and a second sampling module configured to perform the second region-based sampling, wherein the at least one scaling module comprises a first scaling module configured to scale the first plurality of sharpness values and a second scaling module configured to scale the second plurality of sharpness values, wherein the at least one smoothing module comprises a first smoothing module configured to smooth the first plurality of scaled sharpness values and a second smoothing module configured to smooth the second plurality of scaled sharpness values, and wherein the at least one interpolation module comprises a first interpolation module configured to determine the first plurality of interpolated sharpness values and a second interpolation module configured to determine the second plurality of interpolated sharpness values, and wherein the sharpness measurement module, the at least one sampling module, the at least one scaling module, the at least one smoothing module, the at least one interpolation module, and the merge module are implemented via at least one of the one or more processors or the graphics processing unit.

20. The system of claim 11, further comprising:

a geometric model based depth surface module configured to:
determine a top-to-bottom depth map associated with the 2D input image, wherein the top-to-bottom depth map comprise a plurality depth values constant across respective rows of the top-to-bottom depth map increasing from a top of the top-to-bottom depth map to a bottom of the top-to-bottom depth map;
determine one or more edges in the 2D input image, wherein determining the one or more edges comprises at least one of comparing pixel value differences between row pairs of pixels of the 2D input image to a threshold or applying Sobel operators, and wherein determining the one or more edges provides one or more blending factor associated with the one or more edges;
modify the top-to-bottom depth map by the one or more blending factors to generate a geometric model based depth surface;

a first depth contrast enhancement module configured to perform a vertical enhancement of depth contrast on the geometric model based depth surface to generate an enhanced geometric model based depth surface;

a second depth contrast enhancement module configured to perform a second vertical enhancement of depth contrast on the depth map to generate an enhanced depth map;

a first merge module configured to merge the enhanced depth map and the enhanced geometric model based depth surface to generate a merged depth map;

a third depth contrast enhancement module configured to perform a horizontal enhancement of depth contrast on the merged depth map to generate a horizontal enhanced depth map;

a local enhancement module configured to perform edge-based and luma-based local enhancement on the 2D input image to generate an enhanced 2D image;

a second merge module configured to merge the enhanced 2D image and the horizontal enhanced depth map to generate a second merged depth map;

a ghosting reduction module configured to perform a ghosting reduction on the second merged depth map to generate a ghosting reduced depth map;

a temporal filtering module configured to perform a temporal filtering on the ghosting reduced depth map and a second ghosting reduced enhanced depth map temporally preceding the ghosting reduced depth map by a time, t, to generate a temporally filtered ghosting reduced depth map; and a stereo image module configured to generate a left-view stereo image and a right-view stereo image based on the 2D input image and the temporally filtered ghosting reduced depth map, wherein generating the left-view stereo image and the right-view stereo image comprises converting the temporally filtered ghosting reduced depth map to a disparity value map and determining the left-view stereo image and the right-view stereo image based on the second disparity value map.

21. At least one non-transitory machine readable medium comprising a plurality of instructions that in response to being executed on a computing device, cause the computing device to convert a 2-dimensional (2D) image to 3-dimensional (3D) stereo images by:

determining sharpness values for individual pixels of a 2D input image;

performing a first region-based sampling of the sharpness values to determine a first plurality of sample sharpness values and a second region-based sampling of the sharpness values to determine a second plurality of sample sharpness values, wherein the first and second region-based samplings are performed at different resolutions;

scaling the first plurality of sharpness values to generate a first plurality of scaled sharpness values and the second plurality of sharpness values to generate a second plurality of scaled sharpness values;

smoothing the first plurality of scaled sharpness values to generate a first plurality of smoothed sharpness values and the second plurality of scaled sharpness values to generate a second plurality of smoothed sharpness values;

determining a first plurality of interpolated sharpness values based on the first plurality of smoothed sharpness values and a second plurality of interpolated sharpness values based on the second plurality of smoothed sharpness values; and merging the first plurality of interpolated sharpness values and the second plurality of interpolated sharpness values to generate a depth map having a plurality of depth values associated with the 2D input image.

22. The non-transitory machine readable medium of claim 21, further comprising instructions that in response to being executed on the computing device, cause the computing device to convert a 2-dimensional (2D) image to 3-dimensional (3D) stereo images by:

generating a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map.

23. The non-transitory machine readable medium of claim 21, further comprising instructions that in response to being executed on the computing device, cause the computing device to convert a 2-dimensional (2D) image to 3-dimensional (3D) stereo images by:

performing an enhancement of depth contrast on the depth map to generate an enhanced depth map;

performing a ghosting reduction on the enhanced depth map to generate a ghosting reduced enhanced depth map;

performing a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map; and generating a left-view stereo image and a right-view stereo image based on the 2D input image and the temporally filtered ghosting reduced enhanced depth map, wherein generating the left-view stereo image and the right-view stereo image comprises converting the temporally filtered ghosting reduced enhanced depth map to a disparity value map and determining the left-view stereo image and the right-view stereo image based on the second disparity value map.

24. The non-transitory machine readable medium of claim 21, further comprising instructions that in response to being executed on the computing device, cause the computing device to convert a 2-dimensional (2D) image to 3-dimensional (3D) stereo images by:

generating a left-view stereo image and a right-view stereo image based on the 2D input image and the depth map, wherein generating the left-view stereo image and the right-view stereo image comprises converting the depth map to a disparity value map and determining the left-view stereo image and the right-view stereo image based on the disparity value map;

performing an enhancement of depth contrast on the depth map to generate an enhanced depth map, wherein performing the enhancement of depth contrast comprises at least one of:

performing only a vertical enhancement on the depth map to generate the enhanced depth map, performing, in parallel, a vertical enhancement, a left-to-right horizontal enhancement, and a right-to-left horizontal enhancement on the depth map, and combining the vertical enhancement, the left-to-fight horizontal enhancement and the right-to-left horizontal enhancement to generate the enhanced depth map, or first performing a vertical enhancement and subsequently performing a left-to-fight horizontal enhancement and a right-to-left horizontal enhancement to generate the enhanced depth map, wherein performing the vertical enhancement on the depth map comprises:

comparing a pixel value of a first pixel at a first row and a first column of the depth map to a pixel value of a second pixel at a second row and the first column of the depth map, wherein the first row is above the second row;

determining whether a difference between the pixel value of the first pixel and the pixel value of the second pixel is within a threshold; and if the difference is within the threshold, setting the pixel value of the first pixel and the pixel value of the second pixel to the smaller of the first pixel and the pixel value of the second pixel; and if the difference is not within the threshold, making no changes to;

performing a ghosting reduction on the enhanced depth map to generate a ghosting reduced enhanced depth map, wherein performing the ghost reduction comprises at least one of:

shifting the entire enhanced depth map by a depth offset to shift either away from or toward a zero-parallax screen, or modifying brightness values of the enhanced depth map to reduce sharpness and/or contrast at edges within the enhanced depth map;

performing a temporal filtering on the ghosting reduced enhanced depth map and a second ghosting reduced enhanced depth map temporally preceding the ghosting reduced enhanced depth map by a time, t, to generate a temporally filtered ghosting reduced enhanced depth map, wherein performing the temporal filtering comprises:

modifying depth values of the ghosting reduced enhanced depth map based on a weighting factor, wherein the weighting factor is based on an absolute value difference between a depth value in the ghosting reduced enhanced depth map and a depth value in the second ghosting reduced enhanced depth map; and generating a second left-view stereo image and a second fight-view stereo image based on the 2D input image and the temporally filtered ghosting reduced enhanced depth map, wherein generating the second left-view stereo image and the second right-view stereo image comprises converting the temporally filtered ghosting reduced enhanced depth map to a second disparity value map and determining the left-view stereo image and the right-view stereo image based on the second disparity value map, wherein determining the sharpness values for the individual pixels of the input image comprises determining the sharpness values based on pixel values of the individual pixels, wherein the pixel values comprise at least one of luma Y values of the individual pixels or R/G/B values of the individual pixels, wherein determining the sharpness values comprises determining a sharpness value for every pixel of the input image, and wherein determining a first sharpness value for a first individual pixel comprises:

determining, for the first individual pixel of the individual pixels, a vertical sharpness of the first individual pixel as an absolute value difference between an absolute value difference of a pixel value of a pixel above the first individual pixel and a pixel value of the first individual pixel and an absolute value difference of a pixel value of a pixel below the first individual pixel and the pixel value of the first individual pixel;

determining, for the first individual pixel, a horizontal sharpness of the first individual pixel as an absolute value difference between an absolute value difference of a pixel value of a pixel left of the first individual pixel and the pixel value of the first individual pixel and an absolute value difference of a pixel value of a pixel right of the first individual pixel and the pixel value of the first individual pixel; and determining the first sharpness value as at least one of a maximum of the vertical sharpness and the horizontal sharpness or an average of the vertical sharpness and the horizontal sharpness, wherein performing the first region-based sampling and the second region-based sampling comprises at least one of performing samplings at different region sizes or performing samplings at the same region sizes but different downscaling of the sharpness values, wherein scaling the first plurality of sharpness values comprises scaling the first plurality of sharpness values based on a piecewise-linear mapping, wherein smoothing the first plurality of scaled sharpness values comprises applying a 3×3 averaging filter, wherein determining the first plurality of interpolated sharpness values comprises performing a bilinear interpolation, and wherein the first plurality of interpolated sharpness values and the second plurality of interpolated sharpness values each comprise a sharpness value associated with every pixel of the 2D input image, wherein merging the first plurality of interpolated sharpness values and the second plurality of interpolated sharpness values comprises applying a blending factor, wherein the 2D input image comprises at least one of an image file or a video frame, and wherein the depth map is generated in real time.

25. The non-transitory machine readable medium of claim 21, further comprising instructions that in response to being executed on the computing device, cause the computing device to convert a 2-dimensional (2D) image to 3-dimensional (3D) stereo images by:

determining a top-to-bottom depth map associated with the 2D input image, wherein the top-to-bottom depth map comprise a plurality depth values constant across respective rows of the top-to-bottom depth map increasing from a top of the top-to- bottom depth map to a bottom of the top-to-bottom depth map;

determining one or more edges in the 2D input image, wherein determining the one or more edges comprises at least one of comparing pixel value differences between row pairs of pixels of the 2D input image to a threshold or applying Sobel operators, and wherein determining the one or more edges provides one or more blending factor associated with the one or more edges;

modifying the top-to-bottom depth map by the one or more blending factors to generate a geometric model based depth surface;

performing a vertical enhancement of depth contrast on the geometric model based depth surface to generate an enhanced geometric model based depth surface;

performing a second vertical enhancement of depth contrast on the depth map to generate an enhanced depth map;

merging the enhanced depth map and the enhanced geometric model based depth surface to generate a merged depth map;

performing a horizontal enhancement of depth contrast on the merged depth map to generate a horizontal enhanced depth map; performing edge-based and luma-based local enhancement on the 2D input image to generate an enhanced 2D image;

merging the enhanced 2D image and the horizontal enhanced depth map to generate a second merged depth map;

performing a ghosting reduction on the second merged depth map to generate a ghosting reduced depth map;

performing a temporal filtering on the ghosting reduced depth map and a second ghosting reduced enhanced depth map temporally preceding the ghosting reduced depth map by a time, t, to generate a temporally filtered ghosting reduced depth map; and generating a left-view stereo image and a right-view stereo image based on the 2D input image and the temporally filtered ghosting reduced depth map, wherein generating the left-view stereo image and the right-view stereo image comprises converting the temporally filtered ghosting reduced depth map to a disparity value map and determining the left-view stereo image and the right-view stereo image based on the second disparity value map.

* * * * *